(12) United States Patent
Vollath

(10) Patent No.: US 8,717,237 B2
(45) Date of Patent: May 6, 2014

(54) GNSS SIGNAL PROCESSING METHODS AND APPARATUS

(75) Inventor: Ulrich Vollath, Ismaning (DE)

(73) Assignee: Trimble Navigation Limited, Sunnyvale, CA (US)

( * ) Notice: Subject to any disclaimer, the term of this patent is extended or adjusted under 35 U.S.C. 154(b) by 363 days.

(21) Appl. No.: 13/263,072

(22) PCT Filed: Apr. 26, 2010

(86) PCT No.: PCT/US2010/001237
§ 371 (c)(1),
(2), (4) Date: Oct. 5, 2011

(87) PCT Pub. No.: WO2010/129020
PCT Pub. Date: Nov. 11, 2010

(65) Prior Publication Data
US 2012/0026038 A1    Feb. 2, 2012

Related U.S. Application Data

(60) Provisional application No. 61/215,295, filed on May 2, 2009.

(51) Int. Cl.
*G01S 3/02*    (2006.01)

(52) U.S. Cl.
USPC ........................................................ 342/450

(58) Field of Classification Search
USPC ........................................................ 342/450
See application file for complete search history.

(56) References Cited

U.S. PATENT DOCUMENTS

| 6,934,632 B2 | 8/2005 | Hatch |
| 7,312,747 B2 | 12/2007 | Vollath et al. |

(Continued)

FOREIGN PATENT DOCUMENTS

| CN | 1875291 A | 12/2006 |
| WO | 2007/032947 A1 | 3/2007 |

(Continued)

OTHER PUBLICATIONS

International Search Report in International Application No. PCT/US2010/001237, mailed Nov. 20, 2010 (3 pages).

(Continued)

*Primary Examiner* — Harry Liu
(74) *Attorney, Agent, or Firm* — Bruce D Riter

(57) ABSTRACT

Methods and apparatus are provided for processing a set of GNSS signal data derived from observations of GNSS signals of multiple transmitters over multiple epochs, the GNSS signals having a first signal and a second signal in a first band which can be tracked as a single wide-band signal and each of which can be tracked separately, comprising: obtaining carrier-phase observations of the first signal, obtaining carrier-phase observations of the second signal, obtaining code observations of the wide-band signal, and estimating from a set of observables comprising the carrier-phase observations of the first signal, the carrier-phase observations of the second signal and the code observations of the wide-band signal values for a set of parameters comprising: position of a receiver of the GNSS signals, clock error of a receiver of the GNSS signals, and an array of ambiguities comprising an ambiguity for each transmitter from which carrier-phase observations of the first signal are obtained and an ambiguity for each transmitter from which carrier-phase observations of the second signal are obtained.

54 Claims, 9 Drawing Sheets

(56) References Cited

U.S. PATENT DOCUMENTS

| | | | |
|---|---|---|---|
| 7,385,554 B2 * | 6/2008 | Zimmerman et al. | ........ 342/464 |
| 7,432,853 B2 | 10/2008 | Vollath | |
| 7,498,979 B2 | 3/2009 | Liu et al. | |
| 7,538,721 B2 | 5/2009 | Vollath et al. | |
| 7,541,975 B2 | 6/2009 | Sever et al. | |
| 7,589,668 B2 | 9/2009 | Vollath et al. | |
| 7,692,578 B2 | 4/2010 | Vollath et al. | |
| 7,746,272 B2 | 6/2010 | Vollath | |
| 7,755,542 B2 | 7/2010 | Chen et al. | |
| 7,868,820 B2 | 1/2011 | Kolb | |
| 7,982,667 B2 | 7/2011 | Vollath et al. | |
| 8,130,143 B2 | 3/2012 | Liu et al. | |
| 8,237,609 B2 | 8/2012 | Talbot et al. | |
| 8,368,590 B2 | 2/2013 | Vollath et al. | |
| 8,368,591 B2 | 2/2013 | Talbot et al. | |
| 8,400,351 B2 | 3/2013 | Talbot et al. | |
| 2005/0101248 A1 | 5/2005 | Vollath | |
| 2006/0244656 A1 | 11/2006 | Lawrence et al. | |
| 2007/0096980 A1 | 5/2007 | Gradincic et al. | |
| 2009/0027264 A1 | 1/2009 | Chen et al. | |
| 2009/0184869 A1 | 7/2009 | Talbot et al. | |
| 2010/0141515 A1 | 6/2010 | Doucet et al. | |
| 2010/0253575 A1 | 10/2010 | Vollath | |
| 2011/0140959 A1 | 6/2011 | Vollath | |
| 2011/0148698 A1 | 6/2011 | Vollath | |
| 2011/0156949 A1 | 6/2011 | Vollath et al. | |
| 2011/0187590 A1 | 8/2011 | Leandro | |
| 2011/0267228 A1 | 11/2011 | Talbot et al. | |
| 2011/0279314 A1 | 11/2011 | Talbot et al. | |
| 2011/0285587 A1 | 11/2011 | Vollath et al. | |
| 2012/0026038 A1 | 2/2012 | Vollath | |
| 2012/0092213 A1 | 4/2012 | Chen | |
| 2012/0119944 A1 | 5/2012 | Chen | |
| 2012/0154210 A1 | 6/2012 | Landau et al. | |
| 2012/0154214 A1 | 6/2012 | Leandro | |
| 2012/0154215 A1 | 6/2012 | Vollath et al. | |
| 2012/0162007 A1 | 6/2012 | Leandro et al. | |
| 2012/0163419 A1 | 6/2012 | Seeger | |
| 2012/0229332 A1 | 9/2012 | Vollath et al. | |
| 2012/0286991 A1 | 11/2012 | Chen et al. | |
| 2012/0293367 A1 | 11/2012 | Chen et al. | |
| 2012/0306694 A1 | 12/2012 | Chen et al. | |
| 2013/0044026 A1 | 2/2013 | Chen et al. | |

FOREIGN PATENT DOCUMENTS

| | | |
|---|---|---|
| WO | 2007/042461 A1 | 4/2007 |
| WO | 2009/005109 A1 | 4/2009 |
| WO | 2010/021660 A2 | 2/2010 |
| WO | 2010/129020 A2 | 11/2010 |
| WO | 2010/129020 A3 | 1/2011 |
| WO | 2012/128979 A2 | 9/2012 |
| WO | 2012/128980 A1 | 9/2012 |
| WO | 2012/151006 A1 | 11/2012 |

OTHER PUBLICATIONS

International Preliminary Report on Patentability in International Application No. PCT/US2010/001237, dated Nov. 9, 2011, with Written Opinion of the International Searching Authority, mailed Nov. 30, 2010 (4 pages).

Office Action in Chinese Patent Application No. 2010800194331 mailed Apr. 10, 2013 (16 pages), with English-language translation (17 pages).

J.-A. Avila-Rodriguez, "The MBOC Modulation: A Final Touch for the Galileo Frequency and Signal Plan," InsideGNSS, Sep./Oct. 2007, pp. 43-58.

G. Gatti et al., "GIOVE-B Chilbolton In-Orbit Test: Initial Results from the Second Galileo Satellite," InsideGNSS, Sep./Oct. 2008, pp. 30-35.

M.S. Grewal et al., Global Positioning Systems, Inertial Navigation, and Integration, Second Edition, 2007, Chapter 1, pp. 1-17.

G.W. Hein et al., "MBOC: The New Optimized Spreading Modulation Recommended for Galileo L1 OS and GPS L1C," InsideGNSS, May/Jun. 2006, pp. 57-65.

P. Henkel et al., "Three frequency linear combinations for Galileo," 4th Workshop on Positioning, Navigation and Communication 2007 (WPNC '07), Hannover, Germany, pp. 239-245.

P. Henkel et al., "Joint L-/C-Band Code and Carrier Phase Linear Combinations for Galileo," International Journal of Navigation and Observations, vol. 2008, Article ID 651437, 8 pages.

P. Henkel et al., "Modified LAMBDA for absolute carrier phase positioning in the presence of biases," ION 2009 International Technical Meeting, Jan. 26-28, 2009, Anaheim, CA, pp. 642-651.

G. Lachapelle et al., "GNSS Solutions: New GNSS frequencies, advantages of M-Code, and the benefits of a solitary Galileo satellite," InsideGNSS, May/Jun. 2006, pp. 22-27.

S. Lo et al., "GNSS Album: Images and Spectral Signatures of the New GNSS Signals," InsideGNSS, May/Jun. 2006, pp. 46-56.

A. Simsky et al., "Overview of Septentrio's Galileo Receiver Development Strategy," Presented at the Institute of Navigation, ION GNSS 2005, Sep. 13-16, 2005 in Long Beach, California, 8 pages.

Trimble News Release, "New Trimble R8 GNSS System Offers Major Advances in Trimble R-Track Technology for Complete System Efficiency," Trimble Navigation Limited, Las Vegas, Feb. 23, 2009, 3 pages.

S. Verhagen, The GNSS integer ambiguities: estimation and validation, Delft Institue of Earth Observation and Sapce Systems, Delft University of Technology, ISBN 90-804147-4-3, 2004, 196 pages.

U. Vollath, "The Factorized Multi-Carrier Ambiguity Resolution (FAMCAR) Approach for Efficient Carrier-Phase Ambiguity Resolution," ION GNSS 17th International Technical Meeting of the Satellite Division, Sep. 21-24, 2004, Long Beach, CA, pp. 2499-2508.

* cited by examiner

GNSS SIGNAL PROCESSING METHODS AND APPARATUS

CROSS REFERENCE TO RELATED APPLICATIONS

This application claims benefit of U.S. Provisional Application for Patent 61/215,295, VOLLATH U., "GNSS Surveying Methods and Apparatus," filed 2 May 2009, the content of which is incorporated herein by this reference The content of U.S. Pat. No. 7,432,853, VOLLATH U., "Ambiguity Estimation of GNSS Signals for Three or more Carriers," is incorporated herein by this reference.

The content of U.S. patent application Ser. No. 12/286,672, VOLLATH U., "Ambiguity Estimation of GNSS Signals for Three or more Carriers," filed Sep. 30, 2008, is incorporated herein by this reference.

The content of U.S. Pat. No. 7,312,747, VOLLATH U. and DOUCET K., "Multiple-GNSS and FDMA High-Precision Carrier-Phase Based Positioning," dated Dec. 25, 2007 is incorporated herein by this reference.

The content of Patent Application Publication US 2008/0165055, VOLLATH U. and DOUCET K., "GNSS Signal Processing with Frequency-Dependent Bias Modeling," dated Jul. 10, 2008 is incorporated herein by this reference.

The content of Patent Application Publication US 2008/0165054, VOLLATH U. and DOUCET K., "GNSS Signal Processing with Partial Fixing of Algorithms," dated Jul. 10, 2008 is incorporated herein by this reference.

The content of International Patent Publication WO 2007/032947, KOLB, P., "Ionosphere Modeling Apparatus and Methods," dated 22 Mar. 2007 is incorporated herein by this reference.

The content of Patent Application Publication US 2009/0027264, CHEN, X. and VOLLATH U., "GNSS Signal Processing Methods and Apparatus," dated Jan. 29, 2009 is incorporated herein by this reference.

The content of Patent Application Publication US 2008/0165053, Liu, J. and VOLLATH U. and WEST. P. and KLOSE S., "Fast Decimeter-Level GNSS positioning," dated Jul. 10, 2008 is incorporated herein by this reference.

The content of U.S. patent application Ser. No. 12/321,843, LIU, J. and VOLLATH U. and WEST. P. and KLOSE S., "Fast Decimeter-Level GNSS positioning," filed Jan. 26, 2009 is incorporated herein by this reference.

The content of U.S. patent application Ser. No. 12/291,888, VOLLATH U. and KLOSE S., "Real-Time Fast Decimeter-Level GNSS positioning," filed Nov. 14, 2008 is incorporated herein by this reference.

The content of International Patent Publication WO 2009/000314, VOLLATH U. and DOUCET K., "Position Tracking Device and Method," dated 31 Dec. 2008 is incorporated herein by this reference.

The content of U.S. patent application Ser. No. 12/319,623, TALBOT N. and VOLLATH U., "Processing Multi-GNSS Data From Mixed-Type Receivers," filed Jan. 8, 2009 is incorporated herein by this reference.

The content of International Patent Application No. PCT/US2008/012045, VOLLATH U., "Generalized Partial Fixing," with international filing date 23 Oct. 2008 is incorporated herein by this reference.

The content of U.S. Provisional Application for Patent 61/189,382, VOLLATH U. and TALBOT N., "Position Estimation Methods and Apparatus," filed 19 Aug. 2008 is incorporated herein by this reference.

The content of U.S. Provisional Application for Patent 61/208,233, TALBOT N. and VOLLATH U., "GNSS Surveying Methods and Apparatus," filed 22 Feb. 2009 is incorporated herein by this reference.

The content of U.S. Provisional Application for Patent 61/208,340, VOLLATH U. and TALBOT N., "GNSS Surveying Methods and Apparatus," filed 22 Feb. 2009 is incorporated herein by this reference.

FIELD OF THE INVENTION

The present invention relates to the field of Global Navigation Satellite Systems. More particularly, the present invention relates to methods and apparatus for processing of signals from GNSS satellites having multiple signals in a single band which can be tracked together or separately.

BACKGROUND OF THE INVENTION

Global Navigation Satellite Systems (GNSS) include the Global Positioning System (GPS), the GLONASS system, the proposed Galileo system, and the proposed Beidou (Compass) system.

The Global Positioning System completed its original design goals when it attained full operational capability in 1995. Technical advances and new demands on the system have since led to a modernization effort. The GPS modernization project involves new ground stations and new satellites, with additional navigation signals and improved accuracy and availability. The first GPS satellite with three-frequency capability including the new L5 frequency, GPS Block IIF-1, is expected to be launched in the summer of 2009. The new civilian-use L5 signal is expected to improve signal structure for enhanced performance, with higher transmission power and wider bandwidth than the L1 and L2C signals to better manage interference than with L2. Launch of additional three-frequency GPS satellites is planned, with a full three-frequency constellation probably available only 5-7 years later. The GPS signals are each modulated on a separate carrier and are thus individually tracked in a receiver. The GPS system is designed to accommodate two levels of service: civilian and military.

The European Galileo satellite system will have similar capabilities, but may not provide them all free-to-air. The Galileo launch schedule is lagging behind the original plan. To date only two Galileo validation element satellites GIOVE-A and GIOVE-B have been launched. An important difference from the GPS system is that the Galileo system's signal structure is planned to have ten different signals transmitted in four frequency bands, to accommodate four levels of service. The Galileo E1 and E2 signals are on separate carriers in the E2-L1-E1 band (sometimes called the L1 band). The Galileo E1 signal has a wider signal frequency span than the GPS L1 C/A signal, so that a simple receiver processing the main lobe of Galileo E1 Open Service (OS) signal will consume more power than its equivalent processing of the main lobe of the GPS C/A signal. The Galileo E6 signal is on a separate carrier in the E6 band carrying Commercial Service (CS) and Public Regulated Service (PRS) signals. In contrast, the Galileo E5a signal and E5b signal are on a single carrier in the L5-E5a-E5b band. The E5a and E5b signals two spectral components produced by a single modulation called alternate binary offset carrier (altBOC) modulation. The altBOC modulation offers a constant envelope while allowing receivers to differentiate the two spectral lobes. The altBOC modulation allows coherent tracking of the whole E5a+E5b signal as a single wideband signal or non-coherent tracking of each of the E5a and E5b signals separately. The E5a and E5b signals are available to the Open Service (OS), Commercial Service (CS) and Safety of Life (SOL) services.

The Galileo system is the only system currently proposed to transmit a signal in a band having a first signal and a second signal which can be tracked as a single wideband signal or can be tracked separately. The Chinese Compass system is in the early stages of testing and its signal structure may be subject to change. The Russian GLONASS system is expected to have additional frequency capabilities at some time in the future and its signal structure may also be subject to change. India is also planning a GNSS system.

Improved methods and apparatus for processing GNSS signals are desired, particularly to improve ambiguity estimation of GNSS signals having a first signal and a second signal in a band which can be tracked as a single wideband signal or can be tracked separately.

SUMMARY OF THE INVENTION

Methods and apparatus in accordance with embodiments of the invention provide for improved processing of GNSS signals having a first signal and a second signal in a first band which can be tracked as a single wide-band signal and each of which can be tracked separately.

Some embodiments provide for improved ambiguity estimation of such GNSS signals alone. Other embodiments provide for improved ambiguity estimate of such GNSS signals together with other GNSS signal in one or more other bands.

In accordance with some embodiments, methods are provided for processing a set of GNSS signal data derived from observations of GNSS signals of multiple transmitters over multiple epochs, the GNSS signals having a first signal and a second signal in a first band which can be tracked as a single wide-band signal and each of which can be tracked separately, comprising: obtaining carrier-phase observations of the first signal, obtaining carrier-phase observations of the second signal, obtaining code observations of the wide-band signal, and estimating from a set of observables comprising the carrier-phase observations of the first signal, the carrier-phase observations of the second signal and the code observations of the wide-band signal values for a set of parameters comprising: position of a receiver of the GNSS signals, clock error of a receiver of the GNSS signals, and an array of ambiguities comprising an ambiguity for each transmitter from which carrier-phase observations of the first signal are obtained and an ambiguity for each transmitter from which carrier-phase observations of the second signal are obtained.

In accordance with some embodiments, the first signal and the second signal are respective spectral components of a single alternate binary offset carrier modulation. In accordance with some embodiments, the first band is the Galileo E5 band, the single wide-band signal is the Galileo E5ab signal, the first signal is the Galileo E5a signal and the second signal is the Galileo Eb5 signal.

In accordance with some embodiments, the GNSS signals have a third signal in a second band, wherein the method further comprises obtaining carrier-phase observations of the third signal, wherein the set of observables further comprises the carrier-phase observations of the third signal, and wherein the array of ambiguities further comprises an ambiguity for each transmitter from which carrier-phase observations of the third signal are obtained. In accordance with some embodiments, the second band is the Galileo E2-L1-E1 band and the third signal is the Galileo E1 signal.

Some embodiments further comprise obtaining carrier-phase observations of the wide-band signal, wherein the set of observables further comprises the carrier-phase observations of the wide-band signal, and wherein the array of ambiguities further comprises an ambiguity for each transmitter from which carrier-phase observations of the wide-band signal are obtained.

In accordance with some embodiments, the GNSS signals have a fourth signal in a third band, wherein the method further comprises obtaining carrier-phase observations of the fourth signal, wherein the set of observables further comprises the carrier-phase observations of the fourth signal, and wherein the array of ambiguities further comprises an ambiguity for each transmitter from which carrier-phase observations of the fourth signal are obtained. In accordance with some embodiments, the third band is the Galileo E6 band and the fourth signal is the Galileo E6 signal.

Some embodiments further comprise obtaining code observations of the first signal, and the set of observables further comprises the code observations of the first signal. Some embodiments further comprise obtaining code observations of the second signal, wherein the set of observables further comprises the code observations of the second signal. Some embodiments further comprise obtaining code observations of the third signal, wherein the set of observables further comprises the code observations of the third signal. Some embodiments further comprise obtaining code observations of the fourth signal, wherein the set of observables further comprises the code observations of the fourth signal.

In accordance with some embodiments, estimating the set of parameters comprises applying to the set of observations a filter having a plurality of states corresponding to parameters of the set of parameters.

In accordance with some embodiments, estimating the set of parameters comprises: applying to the set of observations a geometry filter using a geometry carrier-phase combination to obtain an array of ambiguity estimates for the geometry carrier-phase combination and associated statistical information; applying to the set of GNSS signal data a bank of geometry-free filters using geometry-free combinations to obtain an array of ambiguity estimates for the geometry-free combinations and associated statistical information; and combining the array of ambiguity estimates for the geometry carrier-phase combination and associated statistical information with the array of ambiguity estimates for the geometry-free carrier-phase combinations and associated statistical information to obtain a combined array of ambiguity estimates for all carrier phase observations and associated statistical information.

In accordance with some embodiments, estimating the set of parameters comprises: applying to the set of observations a geometry filter using a geometry carrier-phase combination to obtain an array of ambiguity estimates for the geometry carrier-phase combination and associated statistical information; applying to the set of GNSS signal data a bank of ionosphere filters using a geometry-free ionosphere carrier-phase combination to obtain an array of ambiguity estimates for the ionosphere carrier-phase combination and associated statistical information; applying to the set of GNSS signal data at least one code filter using a plurality of geometry-free code-carrier combinations to obtain an array of ambiguity estimates for the code-carrier combinations and associated statistical information; and combining the array of ambiguity estimates for the geometry carrier-phase combination and associated statistical information with the array of ambiguity estimates for the ionosphere carrier-phase combination and associated statistical information and the array of ambiguity estimates for the code-carrier combinations and associated statistical information to obtain a combined array of ambiguity estimates for all carrier phase observations and associated statistical information.

In accordance with some embodiments, estimating the set of parameters comprises: applying to the set of observations a geometry filter using a geometry carrier-phase combination to obtain an array of ambiguity estimates for the geometry carrier-phase combination and associated statistical information; applying to the set of GNSS signal data a bank of ionosphere filters using a geometry-free ionosphere carrier-phase combination to obtain an array of ambiguity estimates for the ionosphere carrier-phase combination and associated statistical information; applying to the set of GNSS signal data at least one bank of supplemental (also called Quintessence, or "Q") filters using a geometry-free and ionosphere-free carrier-phase combination to obtain an array of ambiguity estimates for the geometry-free and ionosphere-free carrier-phase combination and associated statistical information; applying to the set of GNSS signal data at least one code filter using a plurality of geometry-free code-carrier combinations to obtain an array of ambiguity estimates for the code-carrier combinations and associated statistical information; and combining the array of ambiguity estimates for the geometry carrier-phase combination and associated statistical information with the array of ambiguity estimates for the ionosphere carrier-phase combination and associated statistical information and the array of ambiguity estimates for the geometry-free and ionosphere-free carrier-phase combination and associated statistical information and the array of ambiguity estimates for the code-carrier combinations and associated statistical information to obtain a combined array of ambiguity estimates for all carrier phase observations and associated statistical information.

In accordance with some embodiments, the ambiguity for each transmitter from which carrier-phase observations of the second signal are obtained is a float value, and wherein the method further comprises reporting the estimated position of the receiver. Some embodiments further comprise fixing at least a subset of the array of ambiguities as integer values, and reporting the estimated position of the receiver. Some embodiments comprise assigning integer values to at least a subset of the array of ambiguities to define a plurality of candidate sets; determining a quality measure for each of the candidate sets; and obtaining a weighted average of at least a subset of the candidate sets in which each candidate set of the weighted average is weighted based on its quality measure.

Some embodiments further comprise applying corrections to the observations prior to estimating the set of parameters from the set of observables.

In accordance with some embodiments, the observations comprise observations of GNSS signals acquired at a rover receiver and the corrections comprise observations of GNSS signals acquired at a reference receiver, wherein applying corrections to the observations comprises combining the observations acquired at the rover receiver with the observations acquired at the reference receiver to obtain differential observations, wherein estimating values for the set of parameters comprises estimating the values from the differential observations, and wherein estimating values for the set of parameters comprises estimating a position of the rover receiver.

In accordance with some embodiments, the observations comprise observations of GNSS signals acquired at a rover receiver and the corrections are derived from observations of GNSS signals acquired at a plurality of reference receivers, wherein applying corrections to the observations comprises combining the observations acquired at the rover receiver with the virtual reference station data to obtain network-corrected observations, wherein estimating values for the set of parameters comprises estimating the values from the network-corrected observations, and wherein estimating values for the set of parameters comprises estimating a position of the rover receiver.

In accordance with some embodiments, the observations comprise observations of GNSS signals acquired at a rover receiver, wherein the corrections comprise satellite orbit data and satellite clock data, wherein applying corrections to the observations comprises combining the observations acquired at the rover receiver with the satellite orbit data and the satellite clock data to obtain corrected observations, wherein estimating values for the set of parameters comprises estimating the values from the corrected observations, and wherein estimating values for the set of parameters comprises estimating a position of the rover receiver.

In accordance with some embodiments, estimating values for the set of parameters is performed substantially in real time (e.g., within seconds of acquiring the observations of the GNSS signals). In accordance with some embodiments, estimating values for the set of parameters is performed in a post-processing operation which is not substantially in real time (e.g., in a post-processing operation performed on previously recorded observations).

In accordance with some embodiments, apparatus is provided to perform methods summarized above. In accordance with some embodiments, a rover receiver is provided including such apparatus. In accordance with some embodiments, a network station is provided including such apparatus. In accordance with some embodiments, a computer program is provided comprising instructions configured, when executed on a computer processing unit, to carry out one or more of the methods summarized above. In accordance with some embodiments, a computer-readable medium is provided comprising a computer program comprising instructions configured, when executed on a computer processing unit, to carry out one or more of the methods summarized above.

BRIEF DESCRIPTION OF THE DRAWING

These and other aspects and features of the present invention will be more readily understood from the embodiments described below with reference to the drawing Figures, in which.

DETAILED DESCRIPTION

Figure 1:
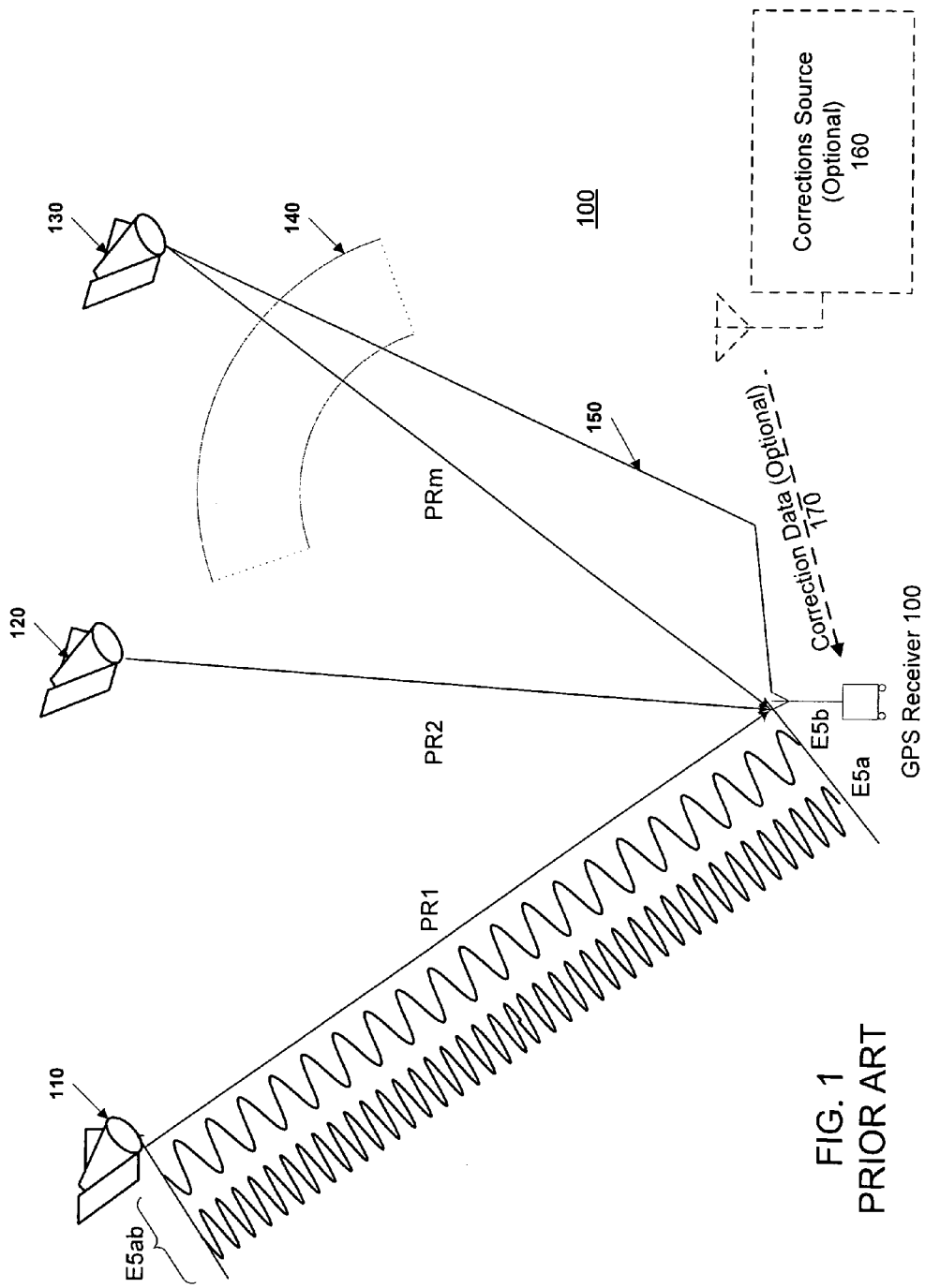
FIG. 1 schematically illustrates a positioning scenario using a GNSS rover receiver capable of receiving GNSS signals having a first signal and a second signal in a first band which is tracked as a single wide-band signal and each of which is tracked separately.

Embodiments of the invention relate generally to any GNSS having a first signal and a second signal in a first band which can be tracked as a single wide-band signal and each of which can be tracked separately.

The Galileo signal structure includes L1, E5a/E5b and E6 bands. The E6 band is a public regulated signal and therefore is unlikely to be available for general use. The E5a and E5a signals can be together as a single wideband signal and each can also be tracked separately. The Chinese Beidou (Compass) satellite system is already under development, however details of the final signal structure are not known. Further details of existing and planned GNSS signal spectra can be found in S. Lo et. al., 2006, *GNSS Album—Images and Spectral Signatures of the New GNSS Signals*, INSIDE GNSS, May/June 2008, pp. 46-56.

Various methods and apparatus are described for processing GNSS signal data derived from observations of GNSS signals which include a first signal and a second signal in a first band which can be tracked as a single wide-band signal and each of which can be tracked separately. The GNSS signals may also further include at least one of a third signal in a second band and a fourth signal in a third band. The GNSS signal data include at least carrier-phase observations for the first signal and the second signal and code (pseudorange) observations for the wideband signal. The GNSS signal data may further include carrier-phase observations and/or code (pseudorange) observations for any or all the signals as will be described.

For purposes of illustration it is assumed that the satellite system in use is Galileo and thus the examples below denote the first signal at E5a, the second signal as E5b, the wideband signal as E5ab, the third signal as E1 and the fourth signal as E6. The approaches presented can be readily translated to the signals of other GNSS satellite systems and of pseudolites without loss of generality, provided the signal structure includes a first signal and a second signal in a first band which can be tracked as a single wide-band signal and each of which can be tracked separately Several options exist for tracking the Galileo E5 frequency: E5a, E5b and E5ab-altboc. The E5ab modulation scheme offers a major advantage in the level of pseudorange error when tracking the E5ab code, while separate tracking of the E5a and E5b signals enables dual-frequency, triple-frequency or even quad-frequency carrier-phase ambiguity resolution with all its advantages for reliability and performance without requiring tracking the proprietary and easily jammed E6 signal. Tracking the E6 signal further enables penta-frequency carrier-phase ambiguity resolution.

Assuming that the center frequencies of E5a and E5b are sufficiently separated to achieve a significantly different multipath error, the optimal choices for the carrier-phase observations are E5a and E5b. Due to the advantages for code-tracking E5ab is the best choice for tracking the E5 pseudoranges. In addition, if E5ab—centered at the E5 frequency—is also uncorrelated to E5a and E5b in terms of multipath, then quad-frequency ambiguity resolution is better than triple frequency. The same holds for "redundant" use of all three codes on E5: E5a/E5b and E5ab.

This approach is also applicable for any other GNSS signal that provides the ability to track different carrier signals on other than the center frequency.

Publications on the use of Galileo signals have proposed the use of E1/E5a/E5b (Simsky, Septentrio cite) or E1/E5/E6 (T.U. Delft cite) carrier-phase observations for triple frequency ambiguity resolution, and have proposed E1/E5ab carrier-phase observations for dual-frequency ambiguity resolution.

Until now, use of E5a/E5b carriers plus E5ab code (pseudorange) observations has not been proposed, nor has use of E1/E5a/E5b carrier-phase observations plus E1/E5ab code (pseudorange) observations. Nor has the use of E1/E5a/E5b/E5ab carrier-phase observations for quad-frequency ambiguity resolution been proposed.

In principle, any combinations of carrier-phase and code (pseudorange) observation data can be used for ambiguity resolution. The observables generally follow the standard observation equations and these can be linearly combined.

The use of three of more carriers has been shown to improve the reliability and/or convergence times of GNSS ambiguity resolution schemes.

The recently introduced Trimble R8 GNSS system is a Galileo-capable GNSS receiver systems with multiple channels enabling the E1, E5a, E5b and E5ab-altboc to be tracked simultaneously. For now, the signals broadcast by the experimental Galileo GIOVE-A and GIOVE-B test satellites can be tracked for evaluation and test purposes.

If significant correlations between the different E5 carriers and/or codes exist, this can be properly modeled in the computation of the float solution.

Generally, the use of the E5ab-altboc pseudorange data is optimally used directly, i.e., not in an observable combination with other pseudoranges from other modulations of frequencies.

A classical float solution formulation in accordance with some embodiments of the invention uses at least E5ab-altboc code (pseudorange) observations together with E5a and E5b carrier-phase observations for dual-frequency ambiguity resolution. Some embodiments of the invention also use E1 carrier-phase observations for triple-frequency ambiguity resolution. Some embodiments of the invention also use E5ab carrier-phase observations for quad-frequency ambiguity resolution. Some embodiments of the invention further use E6 carrier-phase observations for penta-frequency ambiguity resolution. Some embodiments of the invention further use the E1 code observations and/or the E5a code observations and/or the E5b code observations and/or the E6 code observations.

Some embodiments employ a classical float solution formulation for quad-frequency ambiguity resolution using code (pseudorange) observations of at least the E5ab-altboc signal plus (optionally) any combination of E1, E5a and E5b code (pseudorange) observations together with carrier-phase observations of the E5a and E5b signals and, optionally, the E1 signal or the E1 and E5ab signals, or the E1 and E5ab and E6 signals.

Some embodiments employ a factorized multi-carrier implementation such as described in U. Vollath, The Factorized Multi-Carrier Ambiguity Resolution (FAMCAR) Approach for Efficient Carrier-Phase Ambiguity Estimation, ION GNSS 17th International Technical Meeting of the Satellite Division, 21-24 Sep. 2004, Long Beach, Calif., pp. 2499-2508, and in U.S. Pat. No. 7,432,853. In a FAMCAR formulation, some embodiments use E5ab-altboc code-minus-carrier code filters for each Galileo satellite. In some embodiments, the ionosphere filters use any combination of carrier-phase observations of the E5a and E5b signals, or of the E1 and E5ab signals, or of the E1 and E5a signals, or of the E1 and E5b signals. In some embodiments, the supplemental filter (also called a "Quintessence" or "Q" filter) uses carrier phase data from the E1, E5a and E5b signals.

For quad-frequency ambiguity resolution, some embodiments of the FAMCAR implementation use code filters employing a E5ab-altboc code-minus-carrier combination for each Galileo satellite. In some embodiments the ionosphere filters use combinations of carrier-phase observations of the E5a and E5b signals, or of the E1 and E5a signals, or of the E1 and E5b signals, or of the E1 and E5a signals and the E1 and E5b signals. In some embodiments the supplemental filters (also called "Quintessence" or "Q" filters) use carrier-phase observations from the E1, E5a, E5b and E5ab signals.

The following table summarizes the observables of Galileo signals used in some embodiments. Entries marked "X" denote using the observation; those marked "-" denote not using the observation; those marked "O" denote optional use of the observation.

TABLE I

| Description | Carrier-Phase Observables | | | | | Code (Pseudorange) Observables | | | | |
|---|---|---|---|---|---|---|---|---|---|---|
| | E1 | E5a | E5b | E5ab | E6 | E1 | E5a | E5b | E5ab | E6 |
| Dual Frequency (Low-Cost Receiver) | — | X | X | — | — | — | — | — | X | — |
| Triple Frequency (Single Code) | X | X | X | — | — | — | — | — | X | — |
| Triple Frequency (Multi-Code Options) | X | X | X | — | — | O | O | O | X | — |
| Quad Frequency (Single Code) | X | X | X | X | — | — | — | — | X | — |
| Quad Frequency (Multi-Code Options) | X | X | X | X | — | O | O | O | X | — |
| Penta Frequency (Single Code) | X | X | X | X | X | — | — | — | X | — |
| Penta Frequency (Multi-Code Options) | X | X | X | X | X | O | O | O | X | O |

The Galileo E5ab altBOC signal is of particular interest for code observations because of its relative low noise. The capability to acquire these observations is supported in the recently introduced Trimble R8GNSS system. Tracking the E5ab altBOC signal offers strong code (pseudorange tracking with range errors in the 5-10 cm range. Other GNSS signals are more typically in the 20-30 cm range. Combining E5ab code observations with carrier-phase observations of E5a or E5b or E1 is expected to result in good pseudoranges.

Combining E5ab code observations with carrier-phase observations of E5a and E5b provides a three-frequency process which can be implemented in a low-cost single-band receiver, since the radio frequency and other hardware and power requirements are substantially less than for a receiver having multi-band capability.

Noise considerations play a role in judicious selection of which observations to use. For example, the E5b signal is some 2-3 times noisier than the E5ab signal. Averaging observations of the E5a and E5b signals would simply average the noise of the two and would be expected to reduce the pseudorange error by about 30%. In contrast, observations of the E5ab altBOC signal reduces error by a factor of 2 or 3. Good (low noise) pseudorange observations are important because they drive the convergence of carrier-phase ambiguity estimation. Thus, the E5ab signal is a good choice for code (pseudorange) observations.

However, for ambiguity resolution it is helpful to use as many carriers as possible. For more on multi-carrier ambiguity resolution, see, for example, U.S. Pat. No. 7,432,853. It is thus desirable to use the E5a and E5b carrier-phase observables, as well as any of the E1, E5ab and E6 carrier-phase observables as are available. Using any available code observations from the E1, E5a, E5b and E6 signals is also helpful. Many of the variants are covered in Table I above.

From the standpoint of resources (e.g., receiver hardware, processing capacity, power consumption) it is prudent to select subsets of the signal observations which provide the most value for the resources used. Some of the possible observations do not contribute much value. Signals only add value as multiple signals if they are coherent signals from the same satellite. For carrier-phase observations the main issue is multipath, so there is little benefit to using carrier-phase observations of the E5ab signal together with carrier-phase observations of the E5a and E5b signals.

Traditional filtering of GNSS observations uses the well-known float solution. The code (pseudorange) observations are defined as:

$$\underset{K_i}{\rho^s_{L_i,r}} = R^s_r + Tr^s_r + c\Delta t_r - c\Delta t^s + \frac{\lambda^2_{L_i}}{\lambda^2_{L_1}} I^s_r \quad (1)$$

and the carrier-phase observations are defined as:

$$\underset{P_j}{\varphi^s_{L_i,r}} = \frac{1}{\lambda_{L_i}}\left(R + Tr + c\Delta t - c\Delta t^s + \frac{\lambda^2_{L_i}}{\lambda^2_{L_1}} I^s_r\right) + N^s_{L_i,r} \quad (2)$$

where $\underset{K_i}{\rho^s_{L_i,r}}$ is the code observation of a signal L from satellite s at a receiver r $L_i \in \{L_1, L_2, L_5, E_1, E5a, E5b, E5ab\}$ is the set of possible signals, e.g., GPS L1, L2 and L5 and Galileo E1, E5a, E5b and E5ab $K_i \{L_1, L_2, L_5, E_1, E5a, E5b, E5ab\}$ is a prudent selection of code observations $P_j \in \{L_1, L_2, L_5, E_1, E5a, E5b, E5ab\}$ is a prudent selection of carrier-phase observations r is the receiver acquiring the observation s is the satellite (transmitter) from whose signal the observation is acquired.

Tr is a parameter (filter state) for troposphere
$I_r$ is a parameter (filter state) for ionosphere affecting the observation at receiver r
c is the speed of light in vacuum
$t_r$ is a parameter (filter state) for the receiver clock
$t^s$ is a parameter (filter state) for the satellite clock
$\lambda_{L_i}$ is the wavelength of signal $L_i$
$N_{L_{i,r}}{}^s$ is the ambiguity in the carrier-phase observation of signal $L_i$ from satellite s at receiver r In general, it is desirable to select the smallest set of observations that gives good performance. It also desirable to select as many carrier-phase observations as can be afforded, plus not necessarily matching code observations. The number of carrier-phase observations is important for fixing carrier-phase ambiguities, while for code observations the quality of the code observations is most important. Thus, it is desirable to start with the less noisy code observations, and use multiple-frequency carrier-phase observations for ionosphere mitigation and ambiguity estimation. The carrier-phase observations aid multipath mitigation so that the ionosphere information is less noisy. For example, it is desirable to use carriers that are the most widely separated in frequency, the more the better, recognizing that these are mostly valuable on long baselines (between rover and reference receiver in differential operation) and for precise point positioning with a single receiver.

For multipath mitigation it helps if the carrier-phase observations are of similar quality. Weighting each by the sigma of the other, $$\frac{\sigma_2^2 \rho_1 + \sigma_1^2 \rho_2}{\sigma_1^2 + \sigma_2^2} \quad (3)$$

the optimum (minimum noise) is obtained when they are of roughly equal sigma:

$$\sigma^2 \equiv 1 = \frac{1}{2}(\rho_1 + \rho_2) \quad (4)$$

For example, using carrier phase observations from E5ab and E1, where the noise of the E5ab observation is about three times the noise of the E1 observation, $$\frac{3^2 \rho_{E5ab} + 1^2 \rho_{E1}}{3^2 + 1^2} = \frac{9}{10}\rho_{E5ab} + \frac{1}{10}\rho_{E1} \quad (5)$$

Thus, combining carrier-phase observations of a "bad" signal with those of a "good" signal does not help much and is reflected in the final accuracy. Using E1 carrier-phase observations with E5ab carrier-phase observations is only slightly better than using E5ab carrier-phase observations alone.

It is also useful to consider the value of using code (pseudorange) observations of two signals when attempting to model ionosphere from code observations ρ of signals 1 and 2:

$$I = (\rho_2 - \rho_1)\left(\frac{\lambda_1^2}{\lambda_2^2 - \lambda_1^2}\right) \quad (6)$$

where $\left(\frac{\lambda_1^2}{\lambda_2^2 - \lambda_1^2}\right)$ is the ionosphere (wavelength) scaling factor converting the ionospheric information back to the fundamental first frequency.

Rescaling back to iono, because the observations are frequency dependent, if $\lambda_1$ and $\lambda_2$ are close together and have the same σ then:

$$\sigma(I) = \sqrt{2}\,\partial\rho\left(\frac{\lambda_1^2}{\lambda_2^2 - \lambda_1^2}\right) \approx 2 - 3 \quad (7)$$

Thus, ionosphere information is very noisy compared to the individual pseudoranges used and thus provides very little information when the frequencies are close together.

The situation is better if the frequencies are far apart:

$$\sqrt{\sigma_1^2 + \sigma_2^2}\left(\frac{\lambda_1^2}{\lambda_2^2 - \lambda_1^2}\right) \quad (8)$$

where $\sqrt{\sigma_1^2 + \sigma_2^2}$ is dominated by the "worse" code observation.

Thus, the result of averaging code (pseudorange) observations of two signals is better than but close to the worst of the two, but for iono the result is worse than the worst of the two.

There are several reasons why having carrier-phase observations of multiple signals is more desirable than having code (pseudorange) observations of multiple signals:
  error propagation of carrier-phase observations is comparable to that of code observations
  carrier-phase observations have about the same quality, resulting in about the same quality when averaged, in contrast to code observations which are of differing quality and result in a quality close to toe worst of the two when averaged
  for ambiguity resolution it is the final phase accuracy that counts
  accuracy of the receiver position estimate is not as good with the float solution ambiguity estimates as with correct fixed ambiguity values or with a weighted average of integer ambiguity candidate sets
  iono information for each correct integer ambiguity candidate is on the order of 1 cm
  the ambiguities for all carriers must match (besides iono) when building integer ambiguity candidate sets they sometimes don't match These considerations illustrate why it is desirable to optimize the selection of signals for which code observations and carrier-phase observation are used in the estimation process. To summarize: for code filters the quality of best code observation counts, while for iono filters the quality of the worst code observation counts.

By way of comparison, the noise factor for GPS L1/L2 codes σ(I) is 2.2, thus √2 better, and the total factor is 3.

U.S. Pat. No. 7,432,853 describes FAMCAR schemes for two- or three-or more-frequency carrier ambiguity estimation, and for mixed two-frequency and three-or-more-frequency carrier ambiguity estimation. Ionosphere filters form an important part of the FAMCAR estimation scheme for two-or-more frequency ambiguity estimation. On short baselines, ionospheric bias is tightly constrained and this information helps to link the estimation of the ambiguities of the carrier-frequency observations employed in the filters. The supplemental (also called "Quintessence" or "Q") filters do not add the same level of information as the ionosphere filters. On long baselines, where the ionospheric bias is not as well known, the ionosphere filters still provide useful constraint of the relationship between the ambiguities of the carrier-frequency observations. The ionospheric bias constraint is important for successful integer carrier phase ambiguity resolution. When the GNSS signal carriers are coherently derived from the same fundamental frequency reference at the satellite, there is an intrinsic relationship between the carrier ambiguities. This relationship gives rise to a search space where the coincidence of carrier wavefronts only occurs at particular harmonics of the carrier frequencies.

In accordance with some embodiments of the invention, a supplemental filter (also called a "Quintessence" or "Q" filter) is added to model each of the third and subsequent carriers for each satellite.

In accordance with some embodiments, an auxiliary code filter using a code-carrier combination is added to make use of the code-observation on a third frequency, e.g., the E1, the E5a or the E5b to improve the estimation process.

Selection of the observation type for the third-frequency is important. In accordance with some embodiments of the invention, the three-frequency ionosphere filters use a geometry-free, minimum-error, ionospheric combination. In accordance with some embodiments of the invention, the supplemental filters (also called "Quintessence" or "Q filters) use three frequencies to form a geometry-free, iono-free phase combination. In accordance with some embodiments of the invention the code-carrier combination of the auxiliary code filters uses the third frequency code observation (e.g., E5a or E5b where the first and second frequency code observations are E5ab and E1) with a three-frequency carrier-phase combination (e.g., a combination of E5ab/E1/E5a or E5ab/E1/E5b carrier-phase observations) that has an ionospheric bias identical to the ionospheric bias of the code observation (e.g., an E5ab/E1/E5a or E5ab/E1/E5b carrier-phase combination with ionospheric bias matched to the ionospheric bias of the E5a or E5b code observation, respectively).

FIG. 1 schematically illustrates a positioning scenario 100 using a GNSS receiver 105 capable of receiving a first signal (e.g. Galileo E5a) and a second signal (e.g., Galileo E5b) in a first band (e.g., Galileo E5 which can be tracked as a single wide-band signal (e.g., Galileo E5ab altBOC) and each of which can be tracked separately. Each of the signals is tracked by receiver 105 for each of the GNSS satellites in view, such as GNSS satellites 110, 120, 130. The signals are influenced by the earth's atmosphere 140 (particularly by the ionosphere and the troposphere), and by multipath reception as illustrated schematically at 150. Also show in FIG. 1 is an optional corrections source to supply optional correction data 170 for use in processing observations of the satellite signals acquired at receiver 105.

Figure 2:
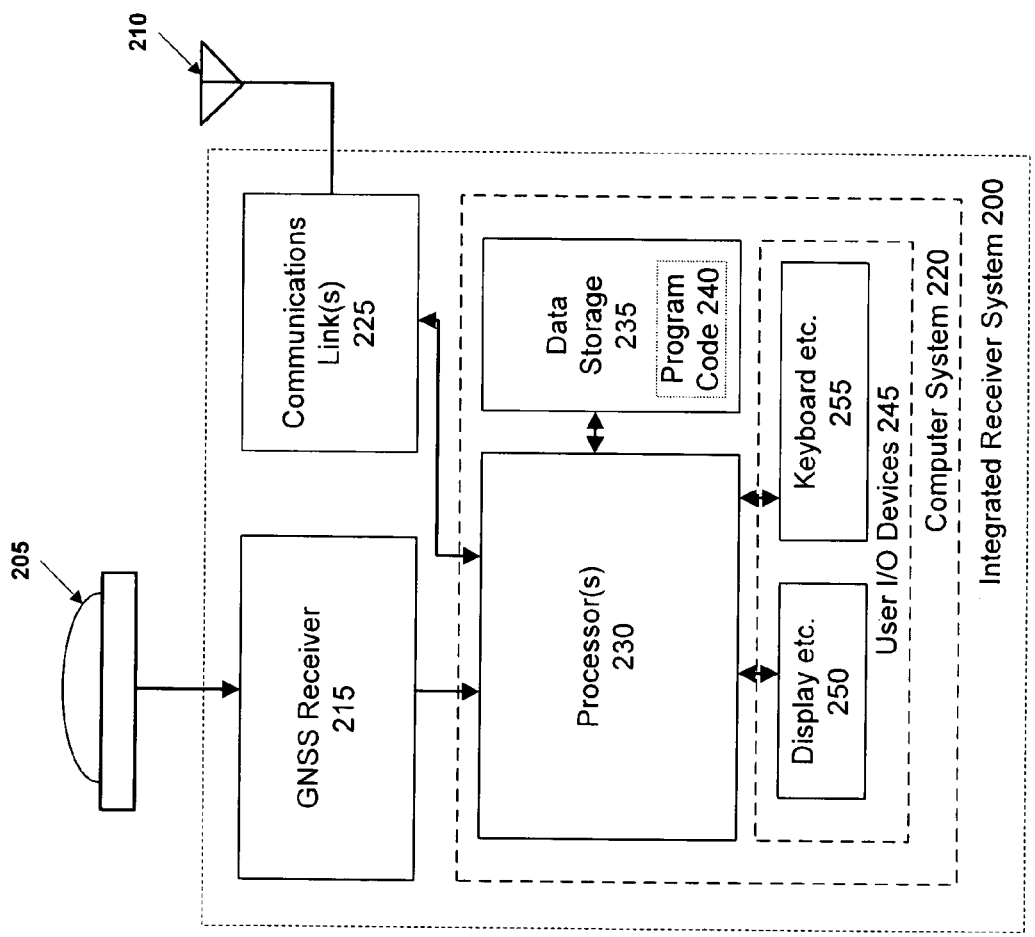
FIG. 2 is a block diagram of an integrated GNSS receiver system capable of receiving GNSS signals having a first signal and a second signal in a first band which is tracked as a single wide-band signal and each of which is tracked separately.
Figure 3:
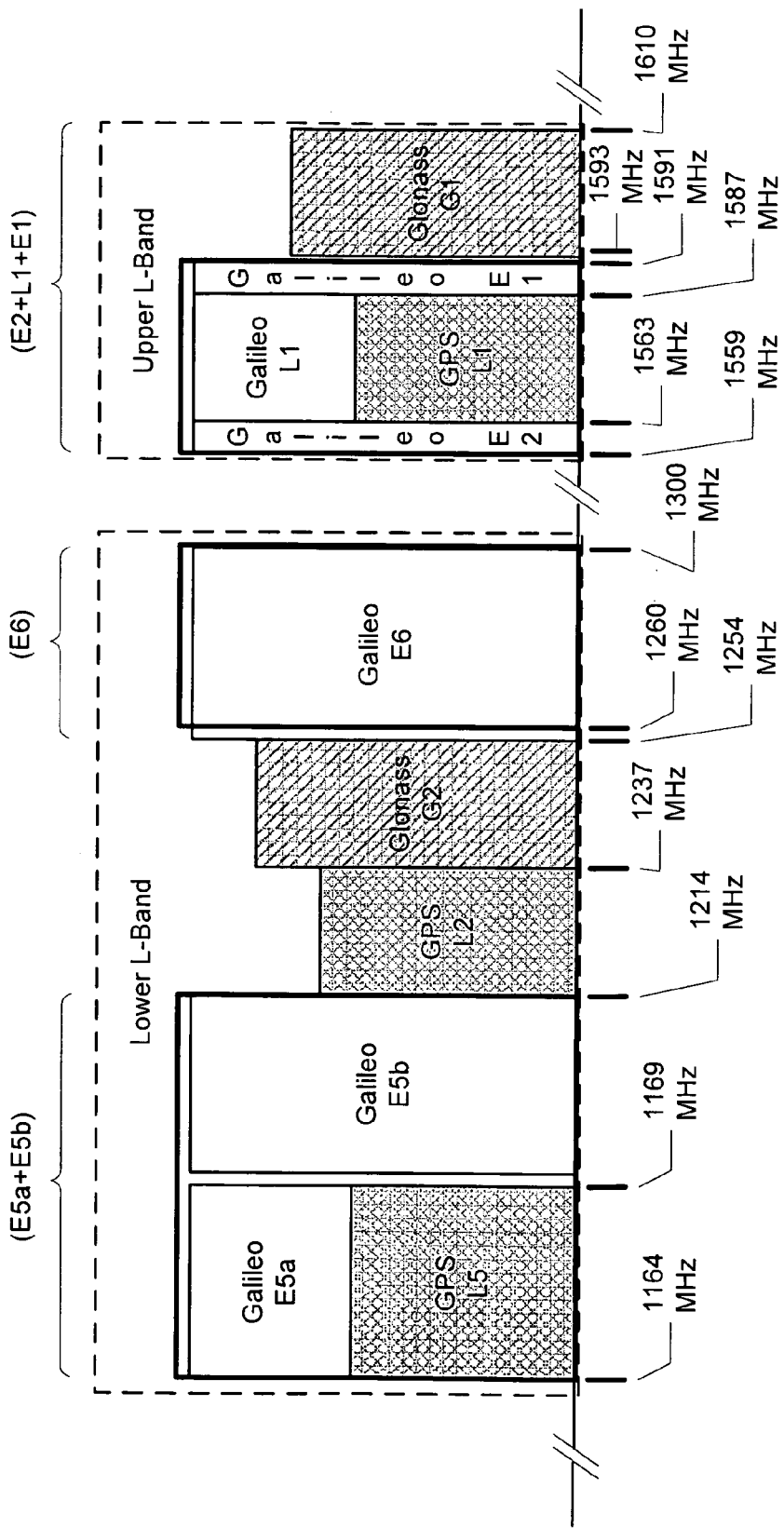
FIG. 3 schematically illustrates the signal structures within the bands of existing GNSS systems.

FIG. 2 is a block diagram of a typical integrated GNSS receiver system 200 with GNSS antenna 205 and communications antenna 210. The Trimble R8 GNSS System is an example of such a system. Receiver system 200 can serve as a rover or base station or reference station. Receiver system 200 includes a GNSS receiver 215, a computer system 220 and one or more communications links 225. Computer system 220 includes one or more processors 230, one or more data storage elements 235, program code 240 with instructions for controlling the processor(s) 230, and user input/output devices 245 which may include one or more output devices 250 such as a display or speaker or printer and one or more devices 255 for receiving user input such as a keyboard or touch pad or mouse or microphone.

Figure 4:
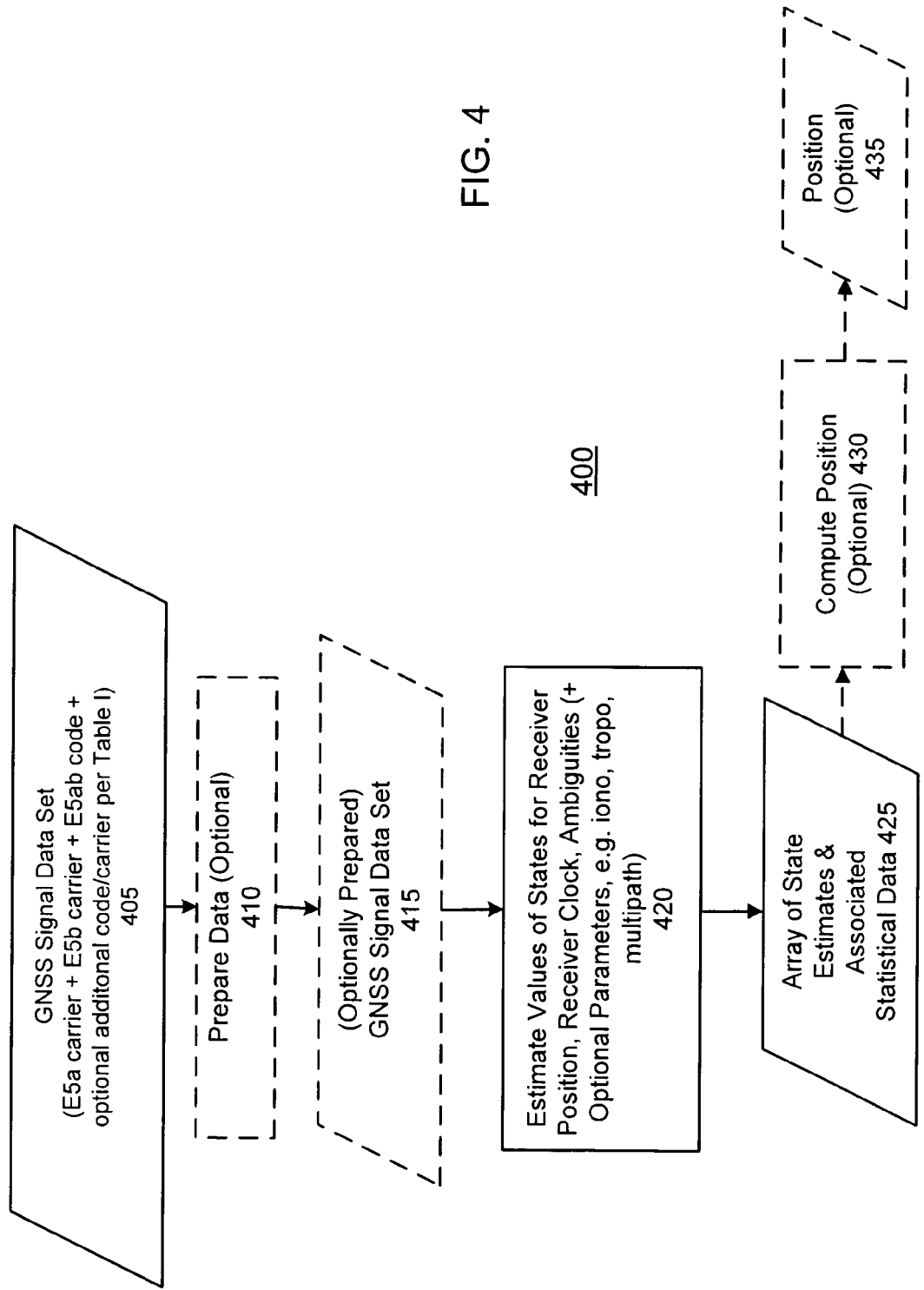
FIG. 4 schematically illustrates a GNSS signal processing flow in accordance with some embodiments of the invention.

FIG. 4 schematically illustrates the lower L-Band and upper L-Band regions of the spectrum where GPS, Glonass and Galileo signals are located. In the lower region of the lower L-Band are the GPS L5, Galileo E5a and E5b and E5ab signals. In the central region of the lower L-Band are the GPS L2 and Glonass G2 signals. In the upper region of the lower L-Band is the Galileo E6 signal. In the lower region of the upper L-Band are the GPS L1, Galileo L1, Galileo E2 and the Galileo E1 signals. In the upper region of the upper L-Band is the Glonass G1 signal.

FIG. 4 schematically illustrates high-level GNSS signal processing flow 400 in accordance with some embodiments of the invention. A GNSS signal data set 405 is a set of observations obtained by receiving signals of multiple satellites at a receiver. GNSS signal data set 405 is optionally prepared at 410 for subsequent filtering. The resulting prepared data 415 includes code (pseudorange) observations and carrier-phase observations of GNSS signal as described above.

In accordance with some embodiments, data preparation 410 involves some or all of the following steps: (1) storage (buffering) of rover epoch GNSS observation data, (2) time-synchronization of reference and rover epoch GNSS observation data once the reference data is received, (3) application of antenna correction models to base and rover observations, (4) optional formation of single—(between base/rover) difference pseudorange and carrier phase observations for each GNSS frequency band, (5) optional application of tropospheric correction models to single-difference observations, (6) optional application of ionospheric correction models to single-difference observations, (7) form linear combination(s) of carrier phase and pseudorange observations for each satellite—e.g., optionally form single-difference iono-free carrier phase combination, single-difference narrow-lane pseudo-range combination, etc. The linear combinations have certain important characteristics that are exploited during the position calculations. For example iono-free combinations are essentially free of ionospheric bias. Single-differencing of GNSS observations (in a situation where differential processing is possible) helps to reduce the impact of satellite dependent error sources. Satellite clock errors are essentially removed by single-difference formation between base and rover receiver data which was collected at the same time instant (epoch). Where single-differencing is not applicable, such as for reference-station network processing or precise point positioning where there is not a single base station. data preparation optionally involves combining the rover receiver observations with other corrections, such as network correction data prepared from observations of the GNSS signals acquired at multiple reference stations or, in the case of precise point positioning, satellite orbit and satellite clock correction data.

Prepared GNSS signal data 415 is supplied to a filtering element 420 estimates values for states of a filter state vector which includes states for receiver position, receiver clock and carrier-phase ambiguities, and which optionally includes states for atmospheric influences such as ionosphere and troposphere and states for multipath and/or other error modeled error sources. The result is an array 425 of estimated values for the states of the state vector with associated statistical data. At 430 an estimated position 435 of the receiver is optionally prepared and reported.

Figure 5:
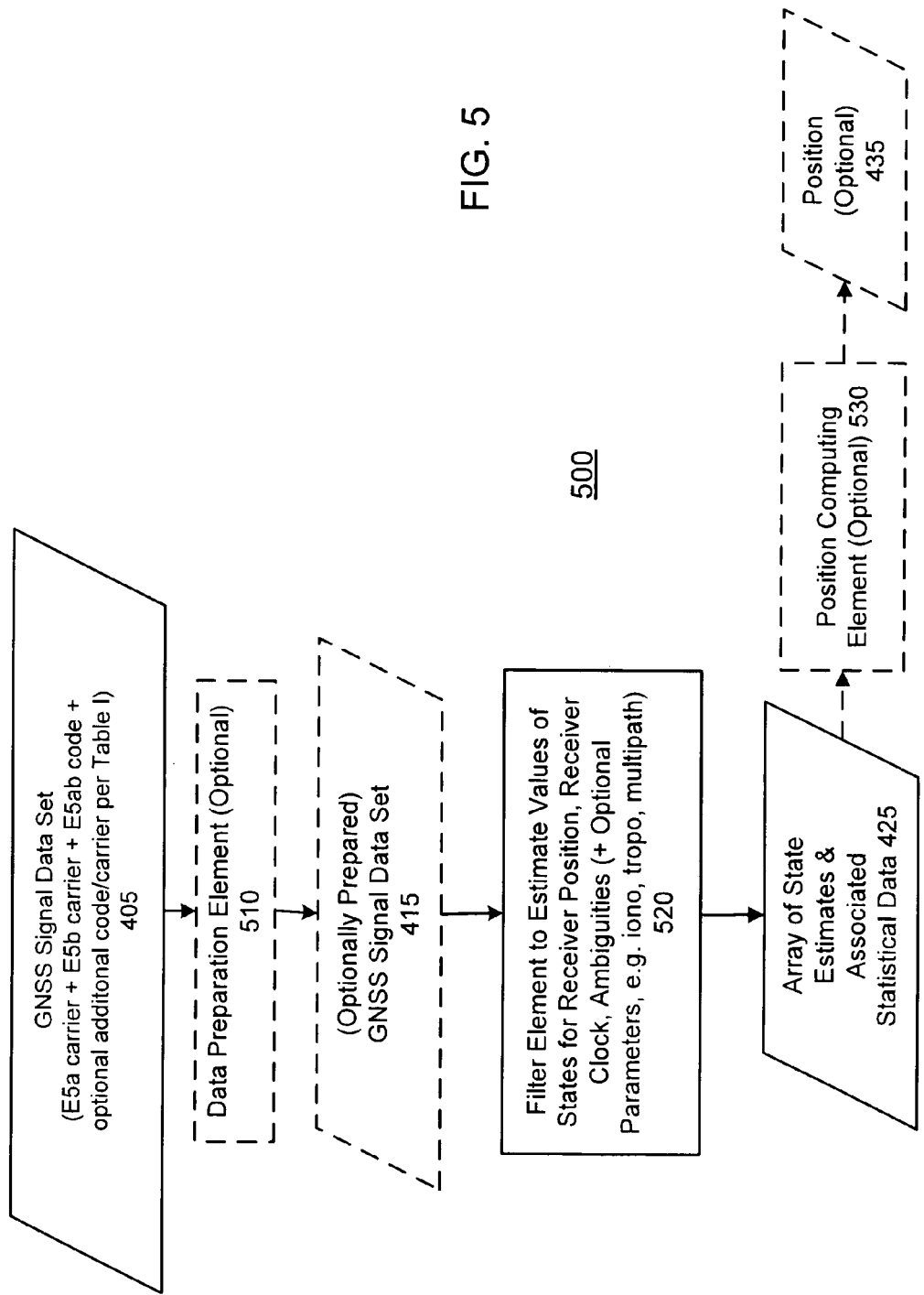
FIG. 5 schematically illustrates a filter architecture in accordance with some embodiments of the invention.

FIG. 5 schematically illustrates an architecture 500 for carrying out the GNSS signal processing flow of FIG. 4 in accordance with some embodiments of the invention. GNSS signal data set 405 is optionally prepared in a data preparation element 510 for subsequent filtering. Prepared GNSS signal data 415 is supplied to a filtering element 420 which estimates array 445 of estimated values for the states of the state vector with associated statistical data. An optional position computing element 530 estimates and reports an estimated position 435 of the receiver.

Figure 6:
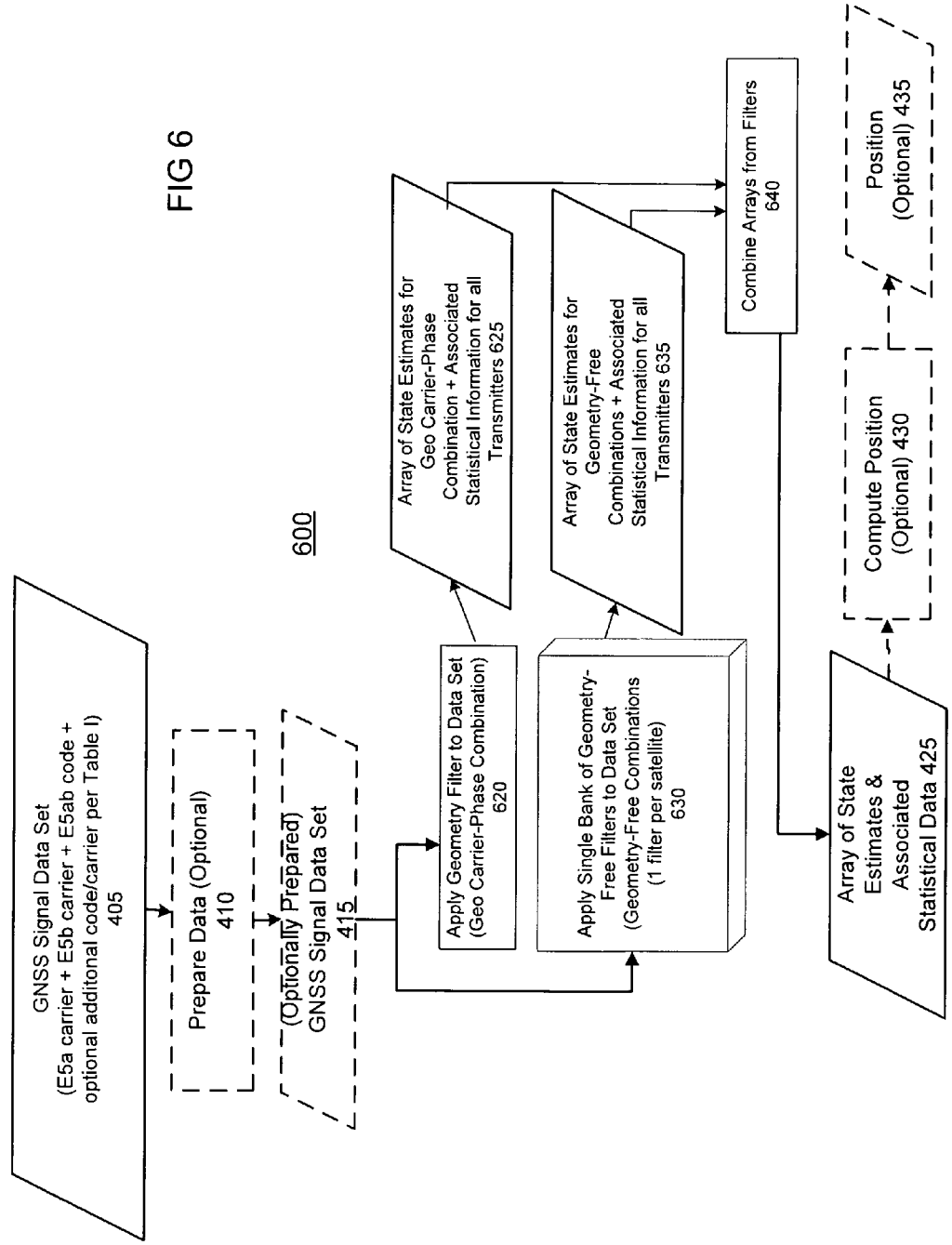
FIG. 6 schematically illustrates a process flow in accordance with some embodiments of the invention.

FIG. 6 shows a variant 600 of the process flow of FIG. 4 similar to that described in U.S. Pat. No. 7,432,853 with reference to FIG. 5 of that patent. In the embodiment of FIG. 6, the estimation process 420 is split into two parts: at 620 applying a geometry filter using a geometry carrier-phase combination to obtain an array 625 of state estimates for the geometry carrier-phase combination with associated statistical information, and at 630 applying a single bank of geometry-free filters using geometry-free combinations to obtain an array 635 of state estimates for the geometry-free combinations with associated statistical information. At 640 the arrays 625 and 635 are combined to form array 425 of state estimates with associated statistical data. The linear nature of the observation equations (1) and (2) above enables linear combination of arrays 625 and 635 and the combined result is identical to array 425 of FIG. 4. At 430 an estimated position 435 of the receiver is optionally prepared and reported.

Figure 7:
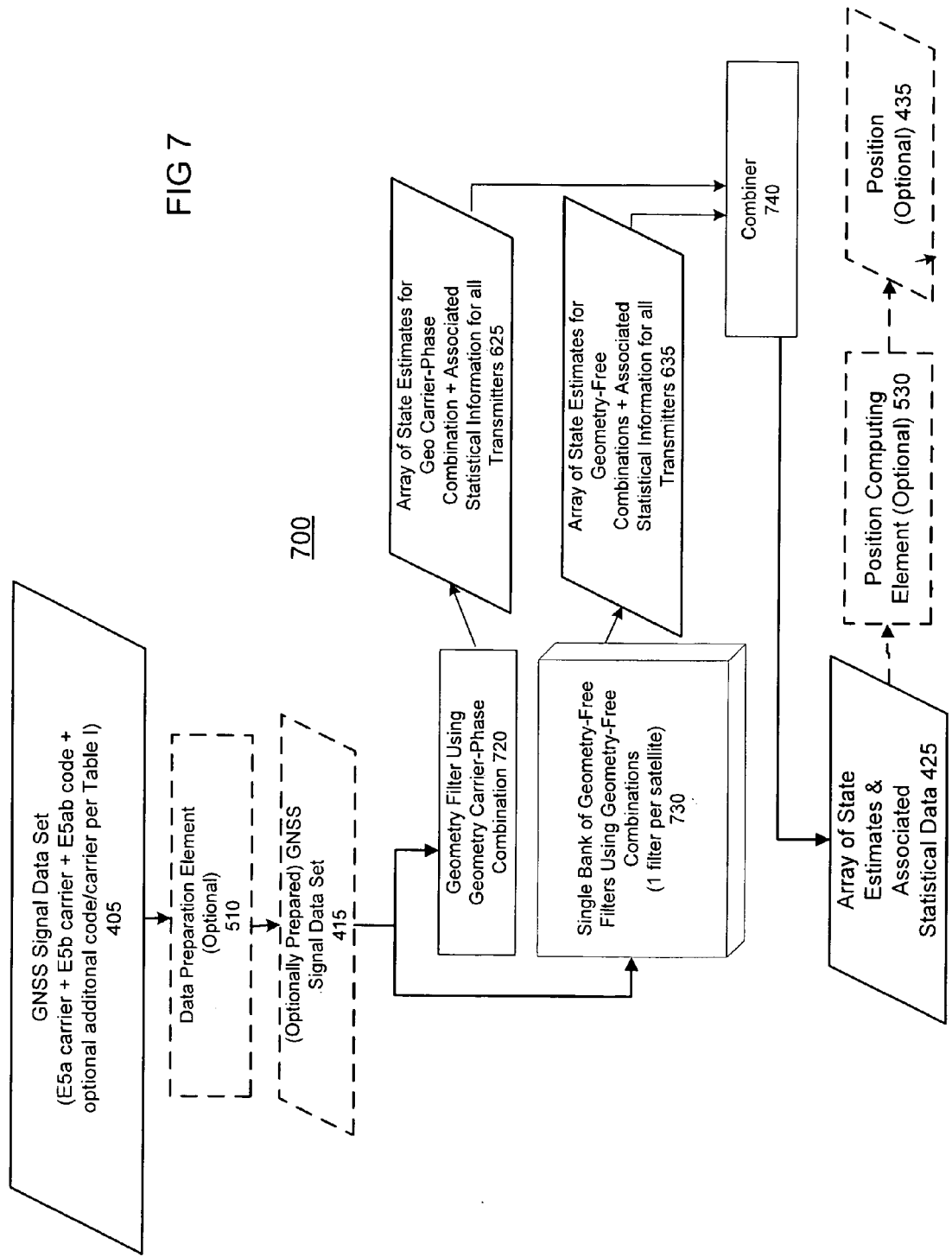
FIG. 7 schematically illustrates a filter architecture in accordance with some embodiments of the invention.

FIG. 7 shows a variant 700 of the architecture of FIG. 5 similar to that described in U.S. Pat. No. 7,432,853. In the embodiment of FIG. 7, the estimation filter element 520 is split into two parts: at 720 a geometry filter using a geometry carrier-phase combination to obtain array 625 of state estimates for the geometry carrier-phase combination with associated statistical information, and at 730 a single bank of geometry-free filters using geometry-free combinations to obtain array 635 of state estimates for the geometry-free combinations with associated statistical information. Combining element 740 combines arrays 625 and 635 to form array 425 of state estimates with associated statistical data. Optional position computing element 430 prepares and reports an estimated position 435 of the receiver.

Figure 8:
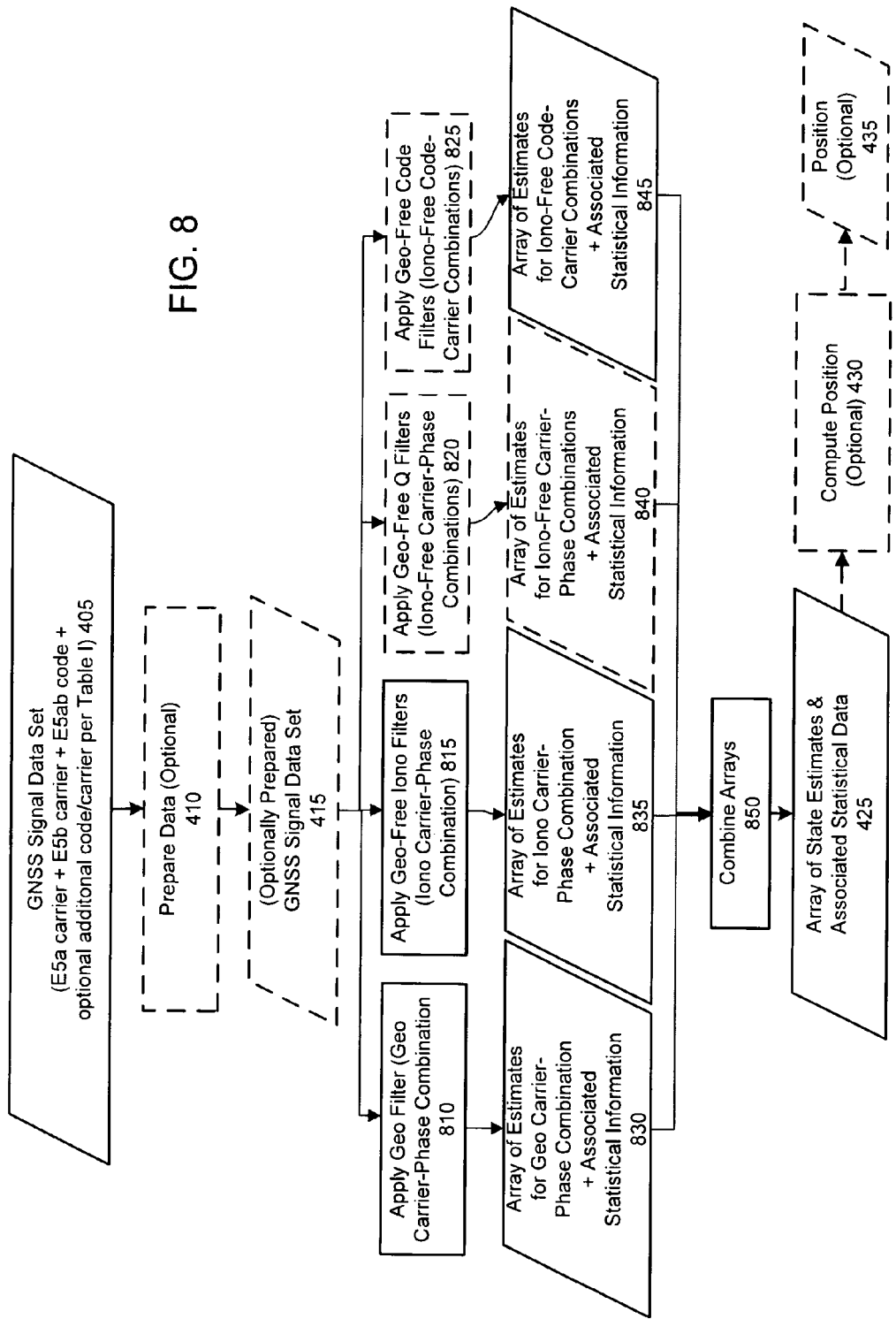
FIG. 8 schematically illustrates a process flow in accordance with some embodiments of the invention.

FIG. 8 schematically illustrates a high-level GNSS signal processing flow 800 in accordance with some embodiments of the invention. FIG. 8 shows a variant 800 of the process flow of FIG. 4 similar to that described in U.S. Pat. No. 7,432,853 with reference to FIG. 6, FIG. 15, FIG. 16 and FIG. 17 of that patent. In the embodiment of FIG. 8, the estimation process 420 is split into multiple parts: at 810 applying a geometry filter using a geometry carrier-phase combination to obtain an array 830 of estimates for the geometry carrier-phase combination with associated statistical information; at 815 applying a bank of ionosphere filters (one filter per satellite) using an ionosphere carrier-phase combination to obtain an array 835 of estimates for the ionosphere carrier-phase combination; at 820 optionally applying one or more banks of additional filters 820 (also called "Quintessence" or "Q" filters, one filter per bank per satellite) using ionosphere-free carrier-phase combinations to obtain an array 840 of estimates for the ionosphere-free carrier-phase combinations; at 825 optionally applying one or more banks of code filters (one filter per bank per satellite) using ionosphere-free code-carrier combinations to obtain an array 845 of estimates for the ionosphere-free code-carrier combinations.

At 850 the arrays 830, 835, 840 and 845 are combined to form array 425 of state estimates with associated statistical data. The linear nature of the observation equations (1) and (2) above enables linear combination of arrays 830, 835, 840 and 845 and the combined result is identical to array 425 of FIG. 4. At 430 an estimated position 435 of the receiver is optionally prepared and reported.

Figure 9:
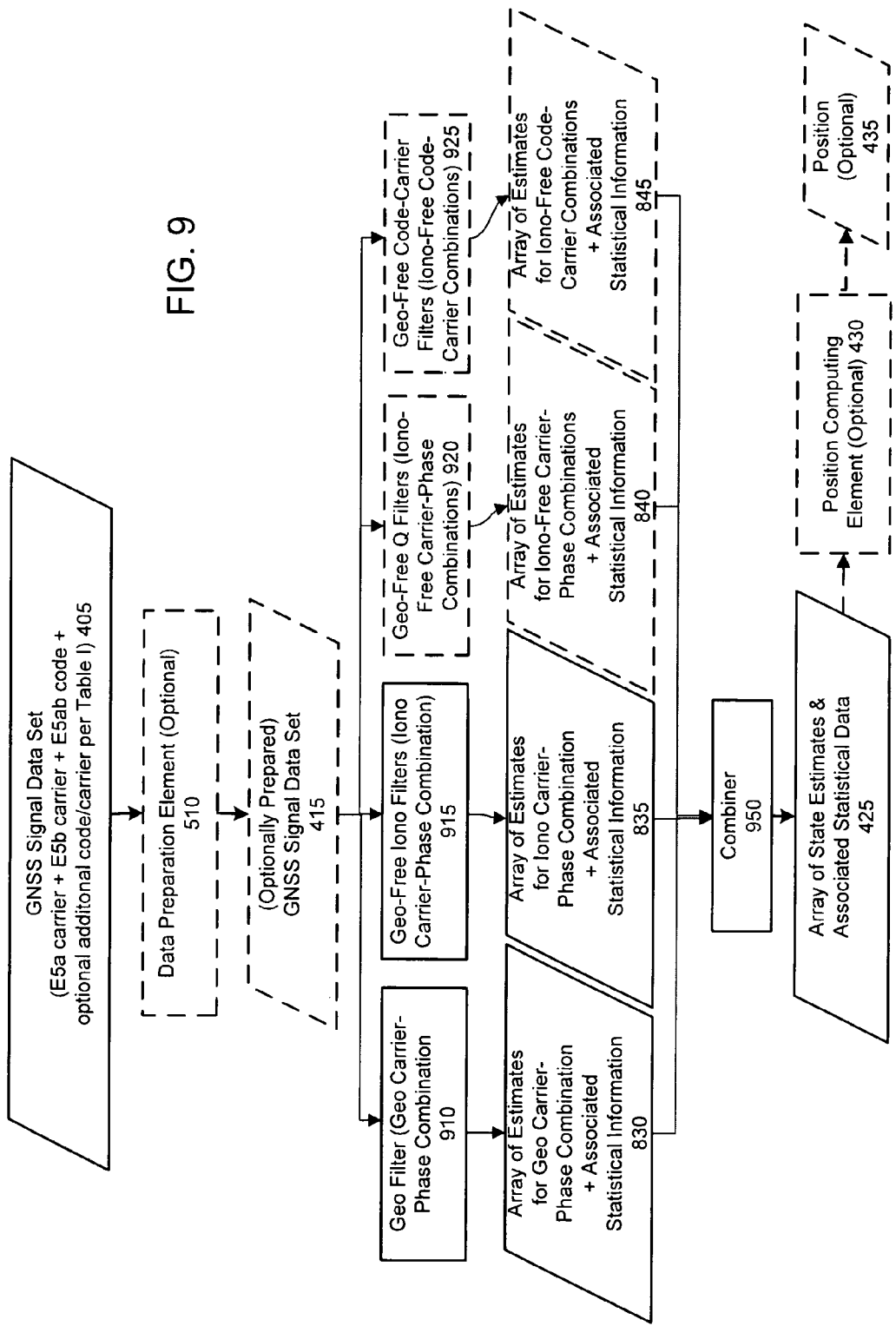
FIG. 9 schematically illustrates a filter architecture in accordance with some embodiments of the invention.

FIG. 9 shows a variant 900 of the architecture of FIG. 5 similar to that described in U.S. Pat. No. 7,432,853 with reference to FIG. 8, FIG. 9, FIG. 10, FIG. 11A, FIG. 11B, FIG. 12A, FIG. 12B, FIG. 13 and FIG. 14 of that patent. In the embodiment of FIG. 8, the filter element 520 is split into multiple parts: a geometry filter 910 using a geometry carrier-phase combination to obtain array 830 of estimates for the geometry carrier-phase combination with associated statistical information; a bank 915 of ionosphere filters (one filter per satellite) using an ionosphere carrier-phase combination to obtain array 835 of estimates for the ionosphere carrier-phase combination; optionally one or more banks 920 of additional filters (also called "Quintessence" or "Q" filters, one filter per bank per satellite) using ionosphere-free carrier-phase combinations to obtain array 840 of estimates for the ionosphere-free carrier-phase combinations; one or more optional banks 925 of code filters (one filter per bank per satellite) using ionosphere-free code-carrier combinations to obtain array 845 of estimates for the ionosphere-free code-carrier combinations.

The maximum number of banks 920 of additional filters is for example two less than the number of observed satellite carrier frequencies. For example, a single bank of additional filters 920 is provided for satellites having three observed carrier frequencies, with up to one filter per three-frequency satellite, and two banks of additional filters 920 are provided for satellites having four observed carrier frequencies, each bank having up to one filter per four-frequency satellite.

A number of banks 925 of code filters can be provided up to the number of observed carrier frequencies. For example, one or two banks 925 of code filters can be provided for satellites having two observed carrier frequencies, each bank having up to one filter per two-frequency satellite. A number of banks of auxiliary code filters can be provided up to the number of observed carrier frequencies. For example, one or two or three banks of auxiliary code filters can be provided for satellites having three observed carrier frequencies, each bank having up to one filter per three-frequency satellite. Similarly, any number from one to four code filter banks is provided for a satellites having four carrier frequencies, each bank having up to one filter per four-frequency satellite.

Some embodiments in accordance with the invention use a federated geometry filter as described in Patent Application Publication US 2009/0027264, CHEN, X. and VOLLATH U., "GNSS Signal Processing Methods and Apparatus," dated Jan. 29, 2009.

Some embodiments in accordance with the invention use ionosphere filters as described in International Patent Publication WO 2007/032947.

Optional position computing element 430 prepares and reports an estimated position 435 of the receiver. Receiver position 435 is computed as a float solution or other type of position solution such as fixed or a combination of float and fixed, as described in U.S. Pat. No. 7,432,853, or determined using a weighted average of ambiguities as described in U.S. Provisional Application for Patent 61/189,382 or using techniques described in S. VERHAGEN, *The GNSS integer ambiguities: estimation and validation*, Delft University of Technology, 2004, ISBN 90-804147-4-3, also published in PUBLICATIONS ON GEODESY 58, Delft, 2005, ISBN-13: 978 90 6132 290 0, ISBN-10: 90 6132 290, incorporated herein by this reference.

Additional features of some embodiments of the invention include the following:

1. (dual-frequency) A method of processing a set of GNSS signal data derived from observations of GNSS signals of multiple transmitters over multiple epochs, the GNSS signals having a first signal and a second signal in a first band which can be tracked as a single wide-band signal and each of which can be tracked separately, comprising:
   a. obtaining carrier-phase observations of the first signal,
   b. obtaining carrier-phase observations of the second signal,
   c. obtaining code observations of the wide-band signal, and
   d. estimating from a set of observables comprising the carrier-phase observations of the first signal, the carrier-phase observations of the second signal and the code observations of the wide-band signal values for a set of parameters comprising: position of a receiver of the GNSS signals, clock error of a receiver of the GNSS signals, and an array of ambiguities comprising an ambiguity for each transmitter from which carrier-phase observations of the first signal are obtained and an ambiguity for each transmitter from which carrier-phase observations of the second signal are obtained.
2. (altboc) The method of 1, wherein the first signal and the second signal are respective spectral components of a single alternate binary offset carrier modulation.
3. (E5ab) The method of one of 1-2, wherein the first band is the Galileo E5 band, the single wide-band signal is the Galileo E5ab signal, the first signal is the Galileo E5a signal and the second signal is the Galileo Eb5 signal.
4. (triple frequency) The method of one of 1-3, wherein the GNSS signals have a third signal in a second band, wherein the method further comprises obtaining carrier-phase observations of the third signal, wherein the set of observables further comprises the carrier-phase observations of the third signal, and wherein the array of ambiguities further comprises an ambiguity for each transmitter from which carrier-phase observations of the third signal are obtained.
5. (E1) The method of 4, wherein the second band is the Galileo E2-L1-E1 band and the third signal is the Galileo E1 signal.
6. (quad frequency) The method of one of 1-5, further comprising obtaining carrier-phase observations of the wide-band signal, wherein the set of observables further comprises the carrier-phase observations of the wide-band signal, and wherein the array of ambiguities further comprises an ambiguity for each transmitter from which carrier-phase observations of the wide-band signal are obtained.
7. (alternate-quad or penta frequency) The method of one of 1-6, wherein the GNSS signals have a fourth signal in a third band, wherein the method further comprises obtaining carrier-phase observations of the fourth signal, wherein the set of observables further comprises the carrier-phase observations of the fourth signal, and wherein the array of ambiguities further comprises an ambiguity for each transmitter from which carrier-phase observations of the fourth signal are obtained.
8. (E6) The method of 7, wherein the third band is the Galileo E6 band and the fourth signal is the Galileo E6 signal.
9. (dual code) The method of one of 1-8, wherein the method further comprises obtaining code observations of the first signal, and wherein the set of observables further comprises the code observations of the first signal.
10. (alternate-dual or triple code) The method of one of 1-9, wherein the method further comprises obtaining code observations of the second signal, and wherein the set of observables further comprises the code observations of the second signal.
11. (alt-dual or alternate-triple or quad code) The method of one of 1-10, wherein the method further comprises obtaining code observations of the third signal, and wherein the set of observables further comprises the code observations of the third signal.
12. (alternate-dual or alternate-triple or alternate-quad or penta code) The method of one of 1-11, wherein the method further comprises obtaining code observations of the fourth signal, and wherein the set of observables further comprises the code observations of the fourth signal.
13. (traditional big filter) The method of one of 1-12, wherein estimating the set of parameters comprises applying to the set of observation a filter having a plurality of states corresponding to parameters of the set of parameters.
14. (separate geometry filter) The method of one of 1-12, wherein estimating the set of parameters comprises:
    i. applying to the set of observations a geometry filter using a geometry carrier-phase combination to obtain an array of ambiguity estimates for the geometry carrier-phase combination and associated statistical information;
    ii. applying to the set of GNSS signal data a bank of geometry-free filters using geometry-free combinations to obtain an array of ambiguity estimates for the geometry-free combinations and associated statistical information; and
    iii. combining the array of ambiguity estimates for the geometry carrier-phase combination and associated statistical information with the array of ambiguity estimates for the geometry-free carrier-phase combinations and associated statistical information to obtain a combined array of ambiguity estimates for all carrier phase observations and associated statistical information.
15. (FAMCAR 2-frequency) The method of one of 1-12, wherein estimating the set of parameters comprises:
    i. applying to the set of observations a geometry filter using a geometry carrier-phase combination to obtain an array of ambiguity estimates for the geometry carrier-phase combination and associated statistical information;
    ii. applying to the set of GNSS signal data a bank of ionosphere filters using a geometry-free ionosphere carrier-phase combination to obtain an array of ambiguity estimates for the ionosphere carrier-phase combination and associated statistical information;
    iii. applying to the set of GNSS signal data at least one code filter using a plurality of geometry-free code-carrier combinations to obtain an array of ambiguity estimates for the code-carrier combinations and associated statistical information; and
    iv. combining the array of ambiguity estimates for the geometry carrier-phase combination and associated statistical information with the array of ambiguity estimates for the ionosphere carrier-phase combination and associated statistical information and the array of ambiguity estimates for the code-carrier combinations and associated statistical information to obtain a combined array of ambiguity estimates for all carrier phase observations and associated statistical information.

16. (FAMCAR 3+ frequency) The method of one of 4-12, wherein estimating the set of parameters comprises:
    i. applying to the set of observations a geometry filter using a geometry carrier-phase combination to obtain an array of ambiguity estimates for the geometry carrier-phase combination and associated statistical information;
    ii. applying to the set of GNSS signal data a bank of ionosphere filters using a geometry-free ionosphere carrier-phase combination to obtain an array of ambiguity estimates for the ionosphere carrier-phase combination and associated statistical information;
    iii. applying to the set of GNSS signal data at least one bank of supplemental (Quintessence, or "Q") filters using a geometry-free and ionosphere-free carrier-phase combination to obtain an array of ambiguity estimates for the geometry-free and ionosphere-free carrier-phase combination and associated statistical information;
    iv. applying to the set of GNSS signal data at least one code filter using a plurality of geometry-free code-carrier combinations to obtain an array of ambiguity estimates for the code-carrier combinations and associated statistical information; and
    v. combining the array of ambiguity estimates for the geometry carrier-phase combination and associated statistical information with the array of ambiguity estimates for the ionosphere carrier-phase combination and associated statistical information and the array of ambiguity estimates for the geometry-free and ionosphere-free carrier-phase combination and associated statistical information and the array of ambiguity estimates for the code-carrier combinations and associated statistical information to obtain a combined array of ambiguity estimates for all carrier phase observations and associated statistical information.
17. (float solution) The method of one of 1-16, wherein the ambiguity for each transmitter from which carrier-phase observations of the second signal are obtained is a float value, and wherein the method further comprises reporting the estimated position of the receiver.
18. (fixed solution) The method of one of 1-17, wherein the ambiguity for each transmitter from which carrier-phase observations of the second signal are obtained is a float value, the method further comprising: fixing at least a subset of the array of ambiguities as integer values, and reporting the estimated position of the receiver.
19. (iFlex solution) The method of one of 1-17, wherein the ambiguity for each transmitter from which carrier-phase observations of the second signal are obtained is a float value, the method further comprising: assigning integer values to at least a subset of the array of ambiguities to define a plurality of candidate sets; determining a quality measure for each of the candidate sets; and obtaining a weighted average of at least a subset of the candidate sets in which each candidate set of the weighted average is weighted based on its quality measure.
20. (corrections) The method of one of 1-19, further comprising applying corrections to the observations prior to estimating the set of parameters from the set of observables.
21. (differential corrections) The method of 20, wherein the observations comprise observations of GNSS signals acquired at a rover receiver and the corrections comprise observations of GNSS signals acquired at a reference receiver, wherein applying corrections to the observations comprises combining the observations acquired at the rover receiver with the observations acquired at the reference receiver to obtain differential observations, wherein estimating values for the set of parameters comprises estimating the values from the differential observations, and wherein estimating values for the set of parameters comprises estimating a position of the rover receiver.
22. (network corrections) The method of 20, wherein the observations comprise observations of GNSS signals acquired at a rover receiver and the corrections are derived from observations of GNSS signals acquired at a plurality of reference receivers, wherein applying corrections to the observations comprises combining the observations acquired at the rover receiver with the virtual reference station data to obtain network-corrected observations, wherein estimating values for the set of parameters comprises estimating the values from the network-corrected observations, and wherein estimating values for the set of parameters comprises estimating a position of the rover receiver.
23. (PPP corrections) The method of 20, wherein the observations comprise observations of GNSS signals acquired at a rover receiver, wherein the corrections comprise satellite orbit data and satellite clock data, wherein applying corrections to the observations comprises combining the observations acquired at the rover receiver with the satellite orbit data and the satellite clock data to obtain corrected observations, wherein estimating values for the set of parameters comprises estimating the values from the corrected observations, and wherein estimating values for the set of parameters comprises estimating a position of the rover receiver.
24. (real-time) The method of one of 1-23, wherein estimating values for the set of parameters is performed substantially in real time.
25. (post-processing) The method of one of 1-23, wherein estimating values for the set of parameters is performed in a post-processing operation which is not substantially in real time.
26. (dual frequency) Apparatus for processing a set of GNSS signal data derived from observations of GNSS signals of multiple transmitters over multiple epochs, the GNSS signals having a first signal and a second signal in a first band which can be tracked as a single wide-band signal and each of which can be tracked separately, comprising:
    a. an element to obtain carrier-phase observations of the first signal,
    b. an element to obtain carrier-phase observations of the second signal,
    c. an element to obtain code observations of the wide-band signal, and
    d. a filtering element to estimate from a set of observables comprising the carrier-phase observations of the first signal, the carrier-phase observations of the second signal and the code observations of the wide-band signal values for a set of parameters comprising: position of a receiver of the GNSS signals, clock error of a receiver of the GNSS signals, and an array of ambiguities comprising an ambiguity for each transmitter from which carrier-phase observations of the first signal are obtained and an ambiguity for each transmitter from which carrier-phase observations of the second signal are obtained.

27. (altboc) The apparatus of 26, wherein the first signal and the second signal are respective spectral components of a single alternate binary offset carrier modulation.

28. (E5ab) The apparatus of one of 26-27, wherein the first band is the Galileo E5 band, the single wide-band signal is the Galileo E5ab signal, the first signal is the Galileo E5a signal and the second signal is the Galileo Eb5 signal.

29. (triple frequency) The apparatus of one of 26-28, wherein the GNSS signals have a third signal in a second band, wherein the apparatus further comprises an element to obtain carrier-phase observations of the third signal, wherein the set of observables further comprises the carrier-phase observations of the third signal, and wherein the array of ambiguities further comprises an ambiguity for each transmitter from which carrier-phase observations of the third signal are obtained.

30. (E1) The apparatus of 29, wherein the second band is the Galileo E2-L1-E1 band and the third signal is the Galileo E1 signal.

31. (quad frequency) The apparatus of one of 26-30, further comprising an element to obtain carrier-phase observations of the wide-band signal, wherein the set of observables further comprises the carrier-phase observations of the wide-band signal, and wherein the array of ambiguities further comprises an ambiguity for each transmitter from which carrier-phase observations of the wide-band signal are obtained.

32. (alternate-quad or penta frequency) The apparatus of one of 26-31, wherein the GNSS signals have a fourth signal in a third band, wherein the apparatus further comprises an element to obtain carrier-phase observations of the fourth signal, wherein the set of observables further comprises the carrier-phase observations of the fourth signal, and wherein the array of ambiguities further comprises an ambiguity for each transmitter from which carrier-phase observations of the fourth signal are obtained.

33. (E6) The apparatus of 32, wherein the third band is the Galileo E6 band and the fourth signal is the Galileo E6 signal.

34. (dual code) The apparatus of one of 26-33, wherein the apparatus further comprises an element to obtain code observations of the first signal, and wherein the set of observables further comprises the code observations of the first signal.

35. (alternate-dual or triple code) The apparatus of one of 26-34, wherein the apparatus further comprises obtaining code observations of the second signal, and wherein the set of observables further comprises the code observations of the second signal.

36. (alternate-dual or alternate-triple or quad code) The apparatus of one of 26-35, wherein the apparatus further comprises an element to obtain code observations of the third signal, and wherein the set of observables further comprises the code observations of the third signal.

37. (alternate-dual or alternate-triple or alternate-quad or penta code) The apparatus of one of 26-36, wherein the apparatus further comprises an element to obtain code observations of the fourth signal, and wherein the set of observables further comprises the code observations of the fourth signal.

38. (traditional big filter) The apparatus of one of 26-37, wherein the filtering element comprises a filter having a plurality of states corresponding to parameters of the set of parameters.

39. (separate geometry filter) The apparatus of one of 26-37, wherein the filtering element comprises:
   i. a geometry filter using a geometry carrier-phase combination to obtain an array of ambiguity estimates for the geometry carrier-phase combination and associated statistical information;
   ii. a bank of geometry-free filters using geometry-free combinations to obtain an array of ambiguity estimates for the geometry-free combinations and associated statistical information; and
   iii. a combining element to combine the array of ambiguity estimates for the geometry carrier-phase combination and associated statistical information with the array of ambiguity estimates for the geometry-free carrier-phase combinations and associated statistical information to obtain a combined array of ambiguity estimates for all carrier phase observations and associated statistical information.

40. (FAMCAR 2-frequency) The apparatus of one of 26-37, wherein the filtering element comprises:
   i. a geometry filter using a geometry carrier-phase combination to obtain an array of ambiguity estimates for the geometry carrier-phase combination and associated statistical information;
   ii. a bank of ionosphere filters using a geometry-free ionosphere carrier-phase combination to obtain an array of ambiguity estimates for the ionosphere carrier-phase combination and associated statistical information;
   iii. at least one code filter using a plurality of geometry-free code-carrier combinations to obtain an array of ambiguity estimates for the code-carrier combinations and associated statistical information; and
   iv. a combining element to combine the array of ambiguity estimates for the geometry carrier-phase combination and associated statistical information with the array of ambiguity estimates for the ionosphere carrier-phase combination and associated statistical information and the array of ambiguity estimates for the code-carrier combinations and associated statistical information to obtain a combined array of ambiguity estimates for all carrier phase observations and associated statistical information.

41. (FAMCAR 3+ frequency) The apparatus of one of 29-37, wherein the filtering element comprises:
   i. a geometry filter using a geometry carrier-phase combination to obtain an array of ambiguity estimates for the geometry carrier-phase combination and associated statistical information;
   ii. a bank of ionosphere filters using a geometry-free ionosphere carrier-phase combination to obtain an array of ambiguity estimates for the ionosphere carrier-phase combination and associated statistical information;
   iii. at least one bank of supplemental (Quintessence, or "Q") filters using a geometry-free and ionosphere-free carrier-phase combination to obtain an array of ambiguity estimates for the geometry-free and ionosphere-free carrier-phase combination and associated statistical information;
   iv. at least one code filter using a plurality of geometry-free code-carrier combinations to obtain an array of ambiguity estimates for the code-carrier combinations and associated statistical information; and v. a combining element to combine the array of ambiguity estimates for the geometry carrier-phase combination and associated statistical information with the array of ambiguity estimates for the ionosphere carrier-phase combination and associated statistical information and the array of ambiguity estimates for the geometry-free and ionosphere-free carrier-phase combination and associated statistical information and the array of ambiguity estimates for the code-carrier combinations and associated statistical information to obtain a combined array of ambiguity estimates for all carrier phase observations and associated statistical information.

42 (float solution) The apparatus of one of 26-41, wherein the ambiguity for each transmitter from which carrier-phase observations of the second signal are obtained is a float value, and wherein the apparatus further comprises an element to report the estimated position of the receiver.

43 (fixed solution) The apparatus of one of 26-41, wherein the ambiguity for each transmitter from which carrier-phase observations of the second signal are obtained is a float value, the apparatus further comprising: a fixing element to fix at least a subset of the array of ambiguities as integer values, and to report the estimated position of the receiver.

44 (weighted solution) The apparatus of one of 26-41, wherein the ambiguity for each transmitter from which carrier-phase observations of the second signal are obtained is a float value, the apparatus further comprising: an assigning element to assign integer values to at least a subset of the array of ambiguities to define a plurality of candidate sets; a quality element to determine a quality measure for each of the candidate sets; and an averaging element to obtain a weighted average of at least a subset of the candidate sets in which each candidate set of the weighted average is weighted based on its quality measure.

45 (corrections) The apparatus of one of 26-44, further comprising a correcting element to apply corrections to the observations and to supply corrected observations to the filtering element.

46 (differential corrections) The apparatus of 45, wherein the observations comprise observations of GNSS signals acquired at a rover receiver and the corrections comprise observations of GNSS signal acquired at a reference receiver, wherein the correcting element is operative to combine observations acquired at the rover receiver with observations acquired at the reference receiver to obtain differential observations, wherein the filtering element is operative to estimate values for the set of parameters from the differential observations, and wherein the filtering element is operative to estimate a position of the rover receiver.

47 (network corrections) The apparatus of 45, wherein the observations comprise observations of GNSS signals acquired at a rover receiver and the corrections are derived from observations of GNSS signals acquired at a plurality of reference receivers, wherein the correcting element is operative to combine the observations acquired at the rover receiver with the virtual reference station data to obtain corrected observations, wherein the filtering element is operative to estimate values for the set of parameters from the corrected observations, and wherein the filtering element is operative to estimate a position of the rover receiver.

48 (PPP corrections) The apparatus of 45, wherein the observations comprise observations of GNSS signals acquired at a rover receiver, wherein the corrections comprise satellite orbit data and satellite clock data, wherein the correcting element is operative to combine the observations acquired at the rover receiver with the satellite orbit data and the satellite clock data to obtain corrected observations, wherein the filtering element is operative to estimate values for the set of parameters from the corrected observations, and wherein the filtering element is operative to estimate a position of the rover receiver.

49 (real-time) The apparatus of one of 26-48, wherein the filtering element is operative to estimate values for the set of parameters substantially in real time.

50 (post-processing) The apparatus of one of 26-48, wherein the filtering element is operative to estimate values for the set of parameters in a post-processing operation which is not substantially in real time.

51 A rover receiver including an apparatus according to any one of 26-50.

52 A network station including an apparatus according to any one of 26-50.

53 A computer program comprising instructions configured, when executed on a computer processing unit, to carry out a method according to any one of 1-25.

54 A computer-readable medium comprising a computer program according to 53.

Any plurality of the above described aspects of the invention may be combined to form further aspects and embodiments, with the aim of providing additional benefits notably in terms of convergence speed, recovery from jumps and/or system usability.

Any of the above-described apparatuses and their embodiments may be integrated into a rover, a reference receiver or a network station, and/or the processing methods described can be carried out in a processor which is separate from and even remote from the receivers used to collect the observations (e.g., observation data collected by one or more receivers can be retrieved from storage for post-processing, or observations from multiple network reference stations can be transferred to a network processor for near-real-time processing to generate a correction data stream and/or virtual-reference-station messages which can be transmitted to one or more rovers). Therefore, the invention also relates to a rover, a reference receiver or a network station including any one of the above apparatuses.

In one embodiment, the receiver of the apparatus of any one of the above-described embodiments is separate from the filter and the processing element. Post-processing and network processing of the observations may notably be performed. That is, the constituent elements of the apparatus for processing of observations does not itself require a receiver. The receiver may be separate from and even owned/operated by a different entity than the entity which is performing the processing. For post-processing, the observations may be retrieved from a set of data which was previously collected and stored, and processed with reference-station data which was previously collected and stored; the processing is conducted for example in an office computer long after the data collection and is thus not real-time. For network processing, multiple reference-station receivers collect observations of the signals from multiple satellites, and this data is supplied to a network processor which may for example generate a correction data stream or which may for example generate a "virtual reference station" correction which is supplied to a rover so that the rover can perform differential processing. The data provided to the rover may be ambiguities determined in the network processor, which the rover may use to speed its position solution, or may be in the form of corrections which the rover applies to improve its position solution. The network is typically operated as a service to rover operators, while the network operator is typically a different entity than the rover operator. This applies to each of the above-described apparatuses and claims.

Any of the above-described methods and their embodiments may be implemented by means of a computer program. The computer program may be loaded on an apparatus, a rover, a reference receiver or a network station as described above. Therefore, the invention also relates to a computer program, which, when carried out on an apparatus, a rover, a reference receiver or a network station as described above, carries out any one of the above above-described methods and their embodiments.

The invention also relates to a computer-readable medium or a computer-program product including the above-mentioned computer program. The computer-readable medium or computer-program product may for instance be a magnetic tape, an optical memory disk, a magnetic disk, a magneto-optical disk, a CD ROM, a DVD, a CD, a random-access memory, a read-only memory, a flash memory unit or the like, wherein the computer program is permanently or temporarily stored. The invention also relates to a computer-readable medium (or to a computer-program product) having computer-executable instructions for carrying out any one of the methods of the invention.

The invention also relates to a firmware update adapted to be installed on receivers already in the field, i.e. a computer program which is delivered to the field as a computer program product. This applies to each of the above-described methods and apparatuses.

GNSS receivers may include an antenna, configured to received the signals at the frequencies broadcasted by the satellites, processor units, one or more accurate clocks (such as crystal oscillators), one or more computer processing units (CPU), one or more memory units (RAM, ROM, flash memory, or the like), and a display for displaying position information to a user.

Where the terms "receiver", "filter" and "processing element" are used herein as units of an apparatus, no restriction is made regarding how distributed the constituent parts of a unit may be. That is, the constituent parts of a unit may be distributed in different software or hardware components or devices for bringing about the intended function. Furthermore, the units may be gathered together for performing their functions by means of a combined, single unit. For instance, the receiver, the filter and the processing element may be combined to form a single unit, to perform the combined functionalities of the units.

The above-mentioned units may be implemented using hardware, software, a combination of hardware and software, pre-programmed ASICs (application-specific integrated circuit), etc. A unit may include a computer processing unit (CPU), a storage unit, input/output (I/O) units, network connection units, etc.

Although the present invention has been described on the basis of detailed examples, the detailed examples only serve to provide the skilled person with a better understanding, and are not intended to limit the scope of the invention. The scope of the invention is much rather defined by the appended claims.

The invention claimed is:

1. A method of processing a set of GNSS signal data derived from observations of GNSS signals of multiple transmitters over multiple epochs, the GNSS signals having a first signal and a second signal in a first band which can be tracked as a single wide-band signal and each of which can be tracked separately, comprising:
   a. obtaining carrier-phase observations of the first signal,
   b. obtaining carrier-phase observations of the second signal,
   c. obtaining code observations of the wide-band signal, and
   d. estimating from a set of observables comprising the carrier-phase observations of the first signal, the carrier-phase observations of the second signal and the code observations of the wide-band signal values for a set of parameters comprising: position of a receiver of the GNSS signals, clock error of a receiver of the GNSS signals, and an array of ambiguities comprising an ambiguity for each transmitter from which carrier-phase observations of the first signal are obtained and an ambiguity for each transmitter from which carrier-phase observations of the second signal are obtained.

2. The method of claim 1, wherein the first signal and the second signal are respective spectral components of a single alternate binary offset carrier modulation.

3. The method of claim 1, wherein the first band is the Galileo E5 band, the single wide-band signal is the Galileo E5ab signal, the first signal is the Galileo E5a signal and the second signal is the Galileo Eb5 signal.

4. The method of claim 1, wherein the GNSS signals have a third signal in a second band, wherein the method further comprises obtaining carrier-phase observations of the third signal, wherein the set of observables further comprises the carrier-phase observations of the third signal, and wherein the array of ambiguities further comprises an ambiguity for each transmitter from which carrier-phase observations of the third signal are obtained.

5. The method of claim 4, wherein the second band is the Galileo E2-L1-E1 band and the third signal is the Galileo E1 signal.

6. The method of claim 1, further comprising obtaining carrier-phase observations of the wide-band signal, wherein the set of observables further comprises the carrier-phase observations of the wide-band signal, and wherein the array of ambiguities further comprises an ambiguity for each transmitter from which carrier-phase observations of the wide-band signal are obtained.

7. The method of claim 1, wherein the GNSS signals have a fourth signal in a third band, wherein the method further comprises obtaining carrier-phase observations of the fourth signal, wherein the set of observables further comprises the carrier-phase observations of the fourth signal, and wherein the array of ambiguities further comprises an ambiguity for each transmitter from which carrier-phase observations of the fourth signal are obtained.

8. The method of claim 7, wherein the third band is the Galileo E6 band and the fourth signal is the Galileo E6 signal.

9. The method of claim 1, wherein the method further comprises obtaining code observations of the first signal, and wherein the set of observables further comprises the code observations of the first signal.

10. The method of claim 1, wherein the method further comprises obtaining code observations of the second signal, and wherein the set of observables further comprises the code observations of the second signal.

11. The method of claim 1, wherein the method further comprises obtaining code observations of the third signal, and wherein the set of observables further comprises the code observations of the third signal.

12. The method of claim 1, wherein the method further comprises obtaining code observations of the fourth signal, and wherein the set of observables further comprises the code observations of the fourth signal.

13. The method of claim 1, wherein estimating the set of parameters comprises applying to the set of observation a filter having a plurality of states corresponding to parameters of the set of parameters.

14. The method of claim 1, wherein estimating the set of parameters comprises:
  i. applying to the set of observations a geometry filter using a geometry carrier-phase combination to obtain an array of ambiguity estimates for the geometry carrier-phase combination and associated statistical information;
  ii. applying to the set of GNSS signal data a bank of geometry-free filters using geometry-free combinations to obtain an array of ambiguity estimates for the geometry-free combinations and associated statistical information; and
  iii. combining the array of ambiguity estimates for the geometry carrier-phase combination and associated statistical information with the array of ambiguity estimates for the geometry-free carrier-phase combinations and associated statistical information to obtain a combined array of ambiguity estimates for all carrier phase observations and associated statistical information.

15. The method of claim 1, wherein estimating the set of parameters comprises:
  i. applying to the set of observations a geometry filter using a geometry carrier-phase combination to obtain an array of ambiguity estimates for the geometry carrier-phase combination and associated statistical information;
  ii. applying to the set of GNSS signal data a bank of ionosphere filters using a geometry-free ionosphere carrier-phase combination to obtain an array of ambiguity estimates for the ionosphere carrier-phase combination and associated statistical information;
  iii. applying to the set of GNSS signal data at least one code filter using a plurality of geometry-free code-carrier combinations to obtain an array of ambiguity estimates for the code-carrier combinations and associated statistical information; and
  iv. combining the array of ambiguity estimates for the geometry carrier-phase combination and associated statistical information with the array of ambiguity estimates for the ionosphere carrier-phase combination and associated statistical information and the array of ambiguity estimates for the code-carrier combinations and associated statistical information to obtain a combined array of ambiguity estimates for all carrier phase observations and associated statistical information.

16. The method of claim 4, wherein estimating the set of parameters comprises:
  i. applying to the set of observations a geometry filter using a geometry carrier-phase combination to obtain an array of ambiguity estimates for the geometry carrier-phase combination and associated statistical information;
  ii. applying to the set of GNSS signal data a bank of ionosphere filters using a geometry-free ionosphere carrier-phase combination to obtain an array of ambiguity estimates for the ionosphere carrier-phase combination and associated statistical information;
  iii. applying to the set of GNSS signal data at least one bank of supplemental (Quintessence, or "Q") filters using a geometry-free and ionosphere-free carrier-phase combination to obtain an array of ambiguity estimates for the geometry-free and ionosphere-free carrier-phase combination and associated statistical information;
  iv. applying to the set of GNSS signal data at least one code filter using a plurality of geometry-free code-carrier combinations to obtain an array of ambiguity estimates for the code-carrier combinations and associated statistical information; and
  v. combining the array of ambiguity estimates for the geometry carrier-phase combination and associated statistical information with the array of ambiguity estimates for the ionosphere carrier-phase combination and associated statistical information and the array of ambiguity estimates for the geometry-free and ionosphere-free carrier-phase combination and associated statistical information and the array of ambiguity estimates for the code-carrier combinations and associated statistical information to obtain a combined array of ambiguity estimates for all carrier phase observations and associated statistical information.

17. The method of claim 1, wherein the ambiguity for each transmitter from which carrier-phase observations of the second signal are obtained is a float value, and wherein the method further comprises reporting the estimated position of the receiver.

18. The method of claim 1, wherein the ambiguity for each transmitter from which carrier-phase observations of the second signal are obtained is a float value, the method further comprising: fixing at least a subset of the array of ambiguities as integer values, and reporting the estimated position of the receiver.

19. The method of claim 1, wherein the ambiguity for each transmitter from which carrier-phase observations of the second signal are obtained is a float value, the method further comprising: assigning integer values to at least a subset of the array of ambiguities to define a plurality of candidate sets; determining a quality measure for each of the candidate sets; and obtaining a weighted average of at least a subset of the candidate sets in which each candidate set of the weighted average is weighted based on its quality measure.

20. The method of claim 1, further comprising applying corrections to the observations prior to estimating the set of parameters from the set of observables.

21. The method of claim 20, wherein the observations comprise observations of GNSS signals acquired at a rover receiver and the corrections comprise observations of GNSS signals acquired at a reference receiver, wherein applying corrections to the observations comprises combining the observations acquired at the rover receiver with the observations acquired at the reference receiver to obtain differential observations, wherein estimating values for the set of parameters comprises estimating the values from the differential observations, and wherein estimating values for the set of parameters comprises estimating a position of the rover receiver.

22. The method of claim 20, wherein the observations comprise observations of GNSS signals acquired at a rover receiver and the corrections are derived from observations of GNSS signals acquired at a plurality of reference receivers, wherein applying corrections to the observations comprises combining the observations acquired at the rover receiver with the virtual reference station data to obtain network-corrected observations, wherein estimating values for the set of parameters comprises estimating the values from the network-corrected observations, and wherein estimating values for the set of parameters comprises estimating a position of the rover receiver.

23. The method of claim 20, wherein the observations comprise observations of GNSS signals acquired at a rover receiver, wherein the corrections comprise satellite orbit data and satellite clock data, wherein applying corrections to the observations comprises combining the observations acquired at the rover receiver with the satellite orbit data and the satellite clock data to obtain corrected observations, wherein estimating values for the set of parameters comprises estimating the values from the corrected observations, and wherein estimating values for the set of parameters comprises estimating a position of the rover receiver.

24. The method of claim 1, wherein estimating values for the set of parameters is performed substantially in real time.

25. The method of claim 1, wherein estimating values for the set of parameters is performed in a post-processing operation which is not substantially in real time.

26. Apparatus for processing a set of GNSS signal data derived from observations of GNSS signals of multiple transmitters over multiple epochs, the GNSS signals having a first signal and a second signal in a first band which can be tracked as a single wide-band signal and each of which can be tracked separately, comprising:
   a. an element to obtain carrier-phase observations of the first signal,
   b. an element to obtain carrier-phase observations of the second signal,
   c. an element to obtain code observations of the wide-band signal, and
   d. a filtering element to estimate from a set of observables comprising the carrier-phase observations of the first signal, the carrier-phase observations of the second signal and the code observations of the wide-band signal values for a set of parameters comprising: position of a receiver of the GNSS signals, clock error of a receiver of the GNSS signals, and an array of ambiguities comprising an ambiguity for each transmitter from which carrier-phase observations of the first signal are obtained and an ambiguity for each transmitter from which carrier-phase observations of the second signal are obtained.

27. The apparatus of claim 26, wherein the first signal and the second signal are respective spectral components of a single alternate binary offset carrier modulation.

28. The apparatus of claim 26, wherein the first band is the Galileo E5 band, the single wide-band signal is the Galileo E5ab signal, the first signal is the Galileo E5a signal and the second signal is the Galileo Eb5 signal.

29. The apparatus of claim 26, wherein the GNSS signals have a third signal in a second band, wherein the apparatus further comprises an element to obtain carrier-phase observations of the third signal, wherein the set of observables further comprises the carrier-phase observations of the third signal, and wherein the array of ambiguities further comprises an ambiguity for each transmitter from which carrier-phase observations of the third signal are obtained.

30. The apparatus of claim 29, wherein the second band is the Galileo E2-L1-E1 band and the third signal is the Galileo E1 signal.

31. The apparatus of claim 26, further comprising an element to obtain carrier-phase observations of the wide-band signal, wherein the set of observables further comprises the carrier-phase observations of the wide-band signal, and wherein the array of ambiguities further comprises an ambiguity for each transmitter from which carrier-phase observations of the wide-band signal are obtained.

32. The apparatus of claim 26, wherein the GNSS signals have a fourth signal in a third band, wherein the apparatus further comprises an element to obtain carrier-phase observations of the fourth signal, wherein the set of observables further comprises the carrier-phase observations of the fourth signal, and wherein the array of ambiguities further comprises an ambiguity for each transmitter from which carrier-phase observations of the fourth signal are obtained.

33. The apparatus of claim 32, wherein the third band is the Galileo E6 band and the fourth signal is the Galileo E6 signal.

34. The apparatus of claim 26, wherein the apparatus further comprises an element to obtain code observations of the first signal, and wherein the set of observables further comprises the code observations of the first signal.

35. The apparatus of claim 26, wherein the apparatus further comprises obtaining code observations of the second signal, and wherein the set of observables further comprises the code observations of the second signal.

36. The apparatus of claim 26, wherein the apparatus further comprises an element to obtain code observations of the third signal, and wherein the set of observables further comprises the code observations of the third signal.

37. The apparatus of claim 26, wherein the apparatus further comprises an element to obtain code observations of the fourth signal, and wherein the set of observables further comprises the code observations of the fourth signal.

38. The apparatus of claim 26, wherein the filtering element comprises a filter having a plurality of states corresponding to parameters of the set of parameters.

39. The apparatus of claim 26, wherein the filtering element comprises:
   i. a geometry filter using a geometry carrier-phase combination to obtain an array of ambiguity estimates for the geometry carrier-phase combination and associated statistical information;
   ii. a bank of geometry-free filters using geometry-free combinations to obtain an array of ambiguity estimates for the geometry-free combinations and associated statistical information; and
   iii. a combining element to combine the array of ambiguity estimates for the geometry carrier-phase combination and associated statistical information with the array of ambiguity estimates for the geometry-free carrier-phase combinations and associated statistical information to obtain a combined array of ambiguity estimates for all carrier phase observations and associated statistical information.

40. The apparatus of claim 26, wherein the filtering element comprises:
   i. a geometry filter using a geometry carrier-phase combination to obtain an array of ambiguity estimates for the geometry carrier-phase combination and associated statistical information;
   ii. a bank of ionosphere filters using a geometry-free ionosphere carrier-phase combination to obtain an array of ambiguity estimates for the ionosphere carrier-phase combination and associated statistical information;
   iii. at least one code filter using a plurality of geometry-free code-carrier combinations to obtain an array of ambiguity estimates for the code-carrier combinations and associated statistical information; and
   iv. a combining element to combine the array of ambiguity estimates for the geometry carrier-phase combination and associated statistical information with the array of ambiguity estimates for the ionosphere carrier-phase combination and associated statistical information and the array of ambiguity estimates for the code-carrier combinations and associated statistical information to obtain a combined array of ambiguity estimates for all carrier phase observations and associated statistical information.

41. The apparatus of claim 29, wherein the filtering element comprises:
   v. a geometry filter using a geometry carrier-phase combination to obtain an array of ambiguity estimates for the geometry carrier-phase combination and associated statistical information;
   vi. a bank of ionosphere filters using a geometry-free ionosphere carrier-phase combination to obtain an array of ambiguity estimates for the ionosphere carrier-phase combination and associated statistical information;
   vii. at least one bank of supplemental (Quintessence, or "Q") filters using a geometry-free and ionosphere-free carrier-phase combination to obtain an array of ambiguity estimates for the geometry-free and ionosphere-free carrier-phase combination and associated statistical information;
   viii. at least one code filter using a plurality of geometry-free code-carrier combinations to obtain an array of ambiguity estimates for the code-carrier combinations and associated statistical information; and
   ix. a combining element to combine the array of ambiguity estimates for the geometry carrier-phase combination and associated statistical information with the array of ambiguity estimates for the ionosphere carrier-phase combination and associated statistical information and the array of ambiguity estimates for the geometry-free and ionosphere-free carrier-phase combination and associated statistical information and the array of ambiguity estimates for the code-carrier combinations and associated statistical information to obtain a combined array of ambiguity estimates for all carrier phase observations and associated statistical information.

42. The apparatus of claim 26, wherein the ambiguity for each transmitter from which carrier-phase observations of the second signal are obtained is a float value, and wherein the apparatus further comprises an element to report the estimated position of the receiver.

43. The apparatus of claim 26, wherein the ambiguity for each transmitter from which carrier-phase observations of the second signal are obtained is a float value, the apparatus further comprising: a fixing element to fix at least a subset of the array of ambiguities as integer values, and to report the estimated position of the receiver.

44. The apparatus of claim 26, wherein the ambiguity for each transmitter from which carrier-phase observations of the second signal are obtained is a float value, the apparatus further comprising: an assigning element to assign integer values to at least a subset of the array of ambiguities to define a plurality of candidate sets; a quality element to determine a quality measure for each of the candidate sets; and an averaging element to obtain a weighted average of at least a subset of the candidate sets in which each candidate set of the weighted average is weighted based on its quality measure.

45. The apparatus of claim 26, further comprising a correcting element to apply corrections to the observations and to supply corrected observations to the filtering element.

46. The apparatus of claim 45, wherein the observations comprise observations of GNSS signals acquired at a rover receiver and the corrections comprise observations of GNSS signal acquired at a reference receiver, wherein the correcting element is operative to combine observations acquired at the rover receiver with observations acquired at the reference receiver to obtain differential observations, wherein the filtering element is operative to estimate values for the set of parameters from the differential observations, and wherein the filtering element is operative to estimate a position of the rover receiver.

47. The apparatus of claim 45, wherein the observations comprise observations of GNSS signals acquired at a rover receiver and the corrections are derived from observations of GNSS signals acquired at a plurality of reference receivers, wherein the correcting element is operative to combine the observations acquired at the rover receiver with the virtual reference station data to obtain corrected observations, wherein the filtering element is operative to estimate values for the set of parameters from the corrected observations, and wherein the filtering element is operative to estimate a position of the rover receiver.

48. The apparatus of claim 45, wherein the observations comprise observations of GNSS signals acquired at a rover receiver, wherein the corrections comprise satellite orbit data and satellite clock data, wherein the correcting element is operative to combine the observations acquired at the rover receiver with the satellite orbit data and the satellite clock data to obtain corrected observations, wherein the filtering element is operative to estimate values for the set of parameters from the corrected observations, and wherein the filtering element is operative to estimate a position of the rover receiver.

49. The apparatus of claim 26, wherein the filtering element is operative to estimate values for the set of parameters substantially in real time.

50. The apparatus of claim 26, wherein the filtering element is operative to estimate values for the set of parameters in a post-processing operation which is not substantially in real time.

51. A rover receiver including an apparatus according to claim 26.

52. A network station including an apparatus according to claim 26.

53. A computer program comprising instructions configured, when executed on a computer processing unit, to carry out a method according to claim 1.

54. A computer-readable medium comprising a computer program according to claim 53.

* * * * *